United States Patent
Yamada et al.

[11] Patent Number: 6,051,946
[45] Date of Patent: Apr. 18, 2000

[54] ELECTRICAL ANGLE DETECTION APPARATUS, METHOD OF DETECTING ELECTRICAL ANGLE, AND MOTOR CONTROL APPARATUS

[75] Inventors: Eiji Yamada, Owariasahi; Yasutomo Kawabata, Aichi-ken, both of Japan

[73] Assignee: Toyota Jidosha Kabushiki Kaisha, Toyota, Japan

[21] Appl. No.: 09/151,349

[22] Filed: Sep. 10, 1998

[30] Foreign Application Priority Data

Sep. 12, 1997 [JP] Japan .................................. 9-968096
Nov. 20, 1997 [JP] Japan .................................. 9-337966

[51] Int. Cl.$^7$ ............................................. H02P 7/00
[52] U.S. Cl. ........................... 318/432; 318/700; 318/720
[58] Field of Search .................................. 318/254, 720, 318/721, 138, 432, 807–811

[56] References Cited

U.S. PATENT DOCUMENTS

| | | |
|---|---|---|
| 4,772,839 | 9/1988 | MacMinn, et al. . |
| 5,028,852 | 7/1991 | Dunfield ................................ 318/254 |
| 5,144,564 | 9/1992 | Naidu, et al. . |
| 5,220,264 | 6/1993 | Yamada . |
| 5,296,794 | 3/1994 | Lang, et al. . |
| 5,339,012 | 8/1994 | Schroedl, et al. . |
| 5,561,355 | 10/1996 | Ideguchi, et al. . |
| 5,569,995 | 10/1996 | Kusaka, et al. . |
| 5,608,300 | 3/1997 | Kawabata et al. ....................... 318/721 |
| 5,648,705 | 7/1997 | Sitar, et al. . |
| 5,714,857 | 2/1998 | Mannel, et al. . |
| 5,726,549 | 3/1998 | Okuno, et al. . |
| 5,764,020 | 6/1998 | Maiocchi . |
| 5,783,917 | 7/1998 | Takekawa . |
| 5,793,167 | 8/1998 | Liang, et al. . |
| 5,796,194 | 8/1998 | Archer, et al. . |
| 5,854,548 | 12/1998 | Taga et al. ............................... 318/721 |
| 5,864,217 | 1/1999 | Lyons, et al. . |
| 5,903,128 | 5/1999 | Sakakibara et al. .................... 318/721 |
| 5,903,129 | 5/1999 | Okuno, et al. . |
| 5,907,225 | 5/1999 | Kim . |
| 5,920,161 | 7/1999 | Obara et al. ............................ 318/139 |
| 5,952,810 | 9/1999 | Yamada, et al. . |
| 5,955,860 | 9/1999 | Taga, et al. . |

*Primary Examiner*—Bentsu Ro
*Assistant Examiner*—Rita Leykin
*Attorney, Agent, or Firm*—Oblon, Spivak, McClelland, Maier & Neustadt, P.C.

[57] ABSTRACT

The conventional technique can not detect the electrical angle of a synchronous motor in a sensor-less manner when a high torque is required under the condition of a low-speed operation of the motor. The direction that passes through the axis of rotation of the motor and causes a magnetic flux to pass through a permanent magnet is defined as a d axis, whereas the direction that is electrically perpendicular to the d axis in the plane of rotation of the motor is defined as a q axis. In the case where the motor is required to output a high torque, the technique of the present invention applies a predetermined detection voltage to the q axis and determines the electrical angle based on the ratio of electric currents flowing through the d axis and the q axis. Application of a negative voltage to the q axis relieves magnetic saturation occurring on the q axis under a high torque condition and thereby allows detection of the electrical angle. When a positive voltage is applied to the q axis, on the other hand, the technique of the present invention refers to a table which is stored in advance to represent the one-to-one mapping of the electrical angle to the electric current flowing through the q axis, and thereby determines the electrical angle.

14 Claims, 15 Drawing Sheets

ELECTRICAL ANGLE DETECTION APPARATUS, METHOD OF DETECTING ELECTRICAL ANGLE, AND MOTOR CONTROL APPARATUS

BACKGROUND OF THE INVENTION

1. Field of the Invention

The present invention relates to a technique of detecting an electrical angle of a synchronous motor in a sensor-less manner as well as a technique of controlling the synchronous motor. More specifically the present invention pertains to these techniques when the synchronous motor is either at a stop or at a low-speed rotation.

2. Description of the Related Art

In a synchronous motor that rotates a rotor through an interaction between a magnetic field occurring when multi-phase alternating currents are flown through windings and a magnetic field produced by permanent magnets, in order to obtain a desired rotational torque, it is required to control the multi-phase alternating currents according to the electrical angle or the electrical position of the rotor. The electrical angle may be detected with a sensor, such as a Hall element. It is, however, desirable to detect the electrical angle in a sensor-less manner, with the view to assuring the reliability of a control apparatus of the synchronous motor.

There is a known method that detects the electrical angle in a sensor-less manner when the synchronous motor is either at a stop or a low-speed rotation. This known method takes advantage of the phenomenon that the magnetic resistance in a magnetic circuit varies with a variation in angle of the rotor and changes the inductances of the windings in a salient-pole permanent magnets-type motor.

The following description regards a permanent magnets-type three-phase synchronous motor. The synchronous motor is expressed by an equivalent circuit that has three-phase coils of U, V, and W phases and a permanent magnet rotating about an axis of rotation as shown in FIG. 4. In the equivalent circuit, the axis that passes through the N pole of the permanent magnet as the positive direction is defined as a d axis, whereas the axis that is electrically perpendicular to the d axis is defined as a q axis. The magnetic field in the q-axis direction is a main dominant factor of the torque of the motor. The electrical angle is defined as a rotational angle $\theta$ of the axis passing through the U-phase coil and the d axis. Ld denotes an inductance of the windings when a voltage is applied to cause a magnetic field in the d-axis direction, and Lq denotes an inductance of the windings when a voltage is applied to cause a magnetic field in the q-axis direction. A motor control apparatus, which controls operation of the synchronous motor, can not first detect the position of the rotor accurately. The motor control apparatus accordingly estimates an electrical angle $\theta c$, which causes an angular error $\Delta\theta$ deviated from the true electrical angle $\theta$ as shown in FIG. 4. The axes estimated as the d axis and the q axis based on the electrical angle $\theta c$ by the motor control apparatus are respectively referred to as a $\gamma$ axis and a $\delta$ axis.

In order to detect the electrical angle in this state, the motor control apparatus applies a voltage in the $\gamma$-axis direction and detects electric currents flowing in the $\gamma$-axis direction and in the $\delta$-axis direction corresponding to the applied voltage. In the case where the $\gamma$ axis estimated by the motor control apparatus coincides with the d axis, no electric current is detected in the $\delta$-axis direction. When there is an angular error $\Delta\theta$ of the electrical angle, on the other hand, an electric current is detected in the $\delta$-axis direction. The electric currents in the $\gamma$-axis direction and in the $\delta$-axis direction vary with a variation in angular error $\Delta\theta$. This accordingly enables calculation of the angular error $\Delta\theta$ based on the observed electric currents and detection of the electrical angle $\theta$. The method of calculating the angular error $\Delta\theta$ will be discussed later.

This known method enables the electrical angle to be detected with a relatively high accuracy when the synchronous motor is either at a stop or a low-speed rotation. In the synchronous motor under such driving conditions, however, this method is not applicable to detect the electrical angle when the torque command value increases to or above the rated torque of the motor. The studies on the technique of controlling the motor in a sensor-less manner have only recently started and not yet referred to this problem.

One possible countermeasure designs the motor to have a sufficiently marginal rating relative to the required torque. This arrangement, however, causes another problem of increasing the size and the weight of the motor.

SUMMARY OF THE INVENTION

The object of the present invention is thus to provide a technique that detects the electrical angle of a synchronous motor with a high accuracy and appropriately controls the synchronous motor even when output of a high torque is required while the synchronous motor is either at a stop or at a low-speed rotation.

In order to realize the above and the other related objects, the technique of the present invention applies a predetermined detection voltage in a direction estimated as a q-axis direction for a predetermined time period to be superposed upon a torque voltage, when a torque command value is present within a predetermined range that includes a specific torque command value, which causes magnetic saturation of windings by application of the torque voltage. The technique of the invention calculates the electrical angle of the synchronous motor based on variations in electric currents flowing through the windings corresponding to the superposed detection voltage. The torque voltage is applied to the windings corresponding to a torque command value to be output by the synchronous motor.

The conventional technique of detecting the electrical angle applies a predetermined positive voltage in the direction estimated as the d axis for a predetermined time period to be superposed upon a torque voltage, even when output of a high torque is required. The technique of the present invention, on the other hand, applies a predetermined detection voltage in the direction estimated as the q axis under such conditions. The predetermined detection voltage applied in the direction estimated as the q-axis direction may be a positive voltage or a negative voltage. Because of the reasons discussed below, this arrangement enables highly accurate detection of the electrical angle even when output of a high torque is required while the synchronous motor is either at a stop or at a low-speed rotation (hereinafter collectively referred to as under low-speed operation).

In the specification hereof, the term 'superposition' or 'to be superposed' implies that the total of a first voltage and a second voltage is applied. Namely the term is used in a wider sense than the general meaning of superposing a signal wave upon a carrier. For example, the expression that a predetermined negative voltage is superposed and applied in the q-axis direction is equivalent to that a predetermined voltage is subtracted from the voltage initially applied in the q-axis direction.

The arrangement of the present invention enables accurate detection of the electrical angle, because of the following reasons. In order to complete the present invention, it is naturally required to elucidate the cause that the conventional method can not successfully detect the electrical angle under the condition of a high-torque requirement. There have been no studies on the phenomenon and the cause that the conventional method can not detect the electrical angle when a high torque is required The inventors of the present invention have elucidated the cause of unsuccessful detection of the electrical angle through a variety of experiments and analyses as discussed below.

As described previously, the electrical angle detection apparatus, which adopts the conventional technique of electrical angle detection, applies a detection voltage $\Delta V\gamma$ in the $\gamma$-axis direction shown in FIG. 4. It is here assumed that an error of the electrical angle occurs in the direction of rotation from the $\gamma$ axis to the d axis shown in FIG. 4, that is, in the direction of rotating the rotor, as the positive direction. Voltages $\Delta Vd$ and $\Delta Vq$ applied to the d axis and the q axis according to the detection voltage $\Delta V\gamma$ are respectively expressed as Equations (1) given below:

$$\Delta Vd = \Delta V\gamma \cdot \cos\Delta\theta$$

$$\Delta Vq = -\Delta V\gamma \cdot \sin\Delta\theta \qquad (1)$$

Electric currents $\Delta Id$ and $\Delta Iq$ flowing in the directions of the d axis and the q axis corresponding to the applied voltages $\Delta Vd$ and $\Delta Vq$ are expressed as Equations (2) given below:

$$\Delta Id = \Delta V\gamma \cdot t \cdot \cos\Delta\theta / Ld$$

$$\Delta Iq = -\Delta V\gamma \cdot t \cdot \sin\Delta\theta / Lq \qquad (2)$$

where Ld and Lq respectively denote the inductances in the d-axis direction and in the q-axis direction, and t denotes the time elapsing after application of the voltage.

The electric currents $\Delta Id$ and $\Delta Iq$ are converted into electric currents $\Delta I\gamma$ and $\Delta I\delta$ flowing in the directions of the $\gamma$ axis and the $\delta$ axis, which are estimated by the electrical angle detection apparatus, as expressed by Equations (3) and (4) given below. For the purpose of reference, FIG. 7 shows variations in electric currents in the $\gamma$-axis direction and the $\delta$-axis direction when the voltage $\Delta V\gamma$ is applied in the $\gamma$-axis direction.

$$\Delta I\gamma = \Delta Id \cdot \cos\Delta\theta - \Delta Iq \cdot \sin\Delta\theta \qquad (3)$$
$$= \Delta V\gamma \cdot t(A + \Delta I \cdot \cos 2\Delta\theta)$$

$$\Delta I\delta = \Delta Id \cdot \sin\Delta\theta - \Delta Iq \cdot \cos\Delta\theta \qquad (4)$$
$$= \Delta V\gamma \cdot t \cdot \Delta I \cdot \sin 2\Delta\theta$$

where $A=(1/Ld+1/Lq)2$ and $\Delta I=(1/Ld-1/Lq)/2$. In the salient pole-type motor shown in FIGS. 3 and 4, the inductances satisfy the relation of Ld<Lq, so that $\Delta I>0$.

Equations (3) and (4) show that the electric currents $\Delta I\gamma$ and $\Delta I\delta$ in the $\gamma$-axis direction and the $\delta$-axis direction periodically vary with a variation in angular error $\Delta\theta$ of the electrical angle. FIG. 8 shows the periodical variations in electric currents. The graph of FIG. 8 shows a value $\Delta I\gamma A$, which is obtained by shifting the electric current $\Delta I\gamma$ according to an equation of $\Delta I\gamma A = \Delta I\gamma - \Delta V\gamma \cdot t \cdot A$. In a relatively small range of the angular error $\Delta\theta$, an approximate equation of $\Delta\theta = \tan(2\Delta\theta)2$ is valid. The angular error $\Delta\theta$ is then calculated according to this approximate equation and Equations (3) and (4) given above. Since it is required to calculate the angular error $\Delta\theta$ in a relatively small range, the method divides the angular error $\Delta\theta$ into sixteen divisions shown in FIG. 8 and specifies the division where the angular error $\Delta\theta$ exists according to the positive and negative signs of $\Delta I\gamma A + \Delta I\delta$ and $\Delta I\gamma A - \Delta I\delta$. The method carries out the arithmetic operations after shifting the angular error $\Delta\theta$ corresponding to the specified division. By way of example, when it is determined that the angular error $\Delta\theta$ exists in the division 10 shown in FIG. 8, $\Delta\theta$ in Equations (3) and (4) is replaced with $\Delta\theta - \pi/4$ as shown in Equations (5) and (6) given below:

$$\Delta I\gamma = \Delta V\gamma \cdot t(A + \Delta I \cdot \cos 2(\Delta\theta - \pi/4)) \qquad (5)$$

$$\Delta I\delta = \Delta V\gamma \cdot t \cdot \Delta I \cdot \sin 2(\Delta\theta - \pi/4) \qquad (6)$$

In this example, the method calculates $\Delta\theta - \pi/4$ according to Equations (5) and (6) and determines $\Delta\theta$ by adding $\pi/4$ to the result of the arithmetic operation. This example regards the case in which there is a positive angular error $\Delta\theta$ (the angular error in the direction of rotation from the $\gamma$ axis to the d axis in FIG. 4). The angular error $\Delta\theta$ can also be determined in the case where there is a negative angular error $\Delta\theta$ (the angular error in the reverse direction).

This method is on the assumption that the inductances satisfy the relation of Ld<Lq and $\Delta I$ is greater than zero. When Ld=Lq, $\Delta I$ becomes equal to zero. In this case, $\Delta I\gamma A$ and $\Delta I\delta$ are constant irrespective of the value of $\Delta\theta$ as clearly understood from Equations (3) and (4), and thereby the angular error $\Delta\theta$ can not be calculated. When Ld>Lq and $\Delta I<0$, the positive and negative of $\Delta I\gamma A$ and $\Delta I\delta$ are reversed in the graph of FIG. 8. In this case, the division can not be specified accurately based on the positive and negative signs of $\Delta I\gamma A + \Delta I\delta$ and $\Delta I\gamma A - \Delta I\delta$. Application of the same method as that for the case of $\Delta I>0$ results in mistakenly specify the division where the angular error $\Delta\theta$ exists, which is deviated by 90 degrees from the true division. This causes a deviation of the calculated electrical angle by 90 degrees from the true electrical angle.

When a small torque is required for the motor, the inductances satisfy the relation of Ld<Lq and no such problems arise. When a large torque is required for the motor, on the other hand, the inductances may be under the condition of Ld$\geq$Lq. This state is described with the graph of FIG. 12, which shows a variation in magnetic flux density B plotted against the strength of an externally generating magnetic field H in the stator of the motor. The externally generating magnetic field H includes a magnetic field produced by permanent magnets of the motor and a magnetic field produced by the electric currents flowing through the windings. The former magnetic field has a fixed strength as long as the strength is divided into the d axis and the q axis. It may thus be considered that the graph of FIG. 12 shows the effect of the electric currents flowing through the windings on the magnetic flux density. In the graph of FIG. 12, the slopes of the tangents at the respective points of a curve Cd corresponding to the d axis and a curve Cq corresponding to the q axis denote the inductances Ld and Lq.

As shown by the curve Cq in the graph of FIG. 12, the magnetic flux density keeps linearity in a range A where the externally generating magnetic field H has a relatively low strength, but causes saturation and becomes non-linear in a range B where the magnetic field H has the strength of or above a predetermined level. When a small torque is required for the motor, the magnetic flux density is in the range A, where the inductances of the d axis and the q axis are different from each other as shown by points a1 and a2 in FIG. 12. This enables detection of the electrical angle. With an increase in torque required for the motor, the electric currents flowing through the windings of the motor increase to enhance the strength of the externally generating magnetic field H. The magnetic flux density accordingly reaches the non-linear range B. The tangent at a point b is parallel to the curve Cd. At this point, the inductances accordingly hold the relation of Lq=Ld. With a further increase in required torque, the magnetic flux density shifts from the point b to a point c and the relation of the inductances is inverted to Lq<Ld as shown in FIG. 12.

The conventional method of detecting the electrical angle is adopted for the motors that have sufficiently marginal rating relative to the torque command value. Namely application of the conventional method is on the assumption that the magnetic flux density of the motor is within the linear range A shown in FIG. 12 and that the inductance has a fixed value. Reduction of the size of the motor results in unsuccessful detection of the electrical angle under the requirement of a high torque. The inventors of the present invention have carried out a variety of experiments and analyses to elucidate the cause of the unsuccessful detection. Lots of factors may be regarded as the cause that the electrical angle can not be detected under the requirement of a high torque. The inventors have elucidated that the fundamental cause of the unsuccessful detection of the electrical angle is that the magnetic flux saturation under the high-torque condition inverts the relation of the inductances in the d-axis direction and the q-axis direction from that under the low-torque condition.

The inventors of the present invention have studied a variation in q-axis electric current corresponding to the detection voltage in the state of magnetic flux saturation, in addition to the elucidation of the cause. It has then been found that there is an unequivocal relationship between the q-axis electric current and the angular error of the estimated electrical angle from the true electrical angle on application of the voltage to the q axis with respect to a variety of torque command values as shown in the graph of FIG. 18. FIG. 18 shows the angular error of the electrical angle as abscissa and the q-axis electric current as ordinate with respect to a variety of torque command values. Parameters i1, i2, . . . represent the electric currents flowing through the q axis corresponding to the torque command values, and the torque command value increases in this sequence.

The present invention is based on the cause and the unequivocal relationship discussed above. In the present invention, the voltage applied to the q axis may be positive or negative. The following describes the reason why the electrical angle can be detected with a high accuracy in the respective cases. The first description regards the case in which a negative voltage is applied to the q axis.

Application of a negative voltage aims to cancel the effect of the magnetic saturation on detection of the electrical angle. When a voltage is applied in the negative direction, the strength of the externally generating magnetic field decreases in the q-axis direction. Such a decrease enables detection of the electric current in the linear range A shown in FIG. 12 and causes the inductances to satisfy the relation of Ld<Lq. This enables the electrical angle to be detected even under the requirement of a high torque. The magnitude of the negative voltage to be superposed may be determined experimentally or arithmetically, in order to attain sufficient relieve of the magnetic flux saturation, based on the characteristics of magnetic flux saturation of the stator.

The following briefly describes calculation of the angular error $\Delta\theta$ of the electrical angle on application of a voltage to the q axis, although the details of the calculation will be discussed later. When a predetermined negative voltage is applied to the q axis, Equations (7) and (8) given below are valid as corresponding to Equations (3) and (4) discussed above in the case where a voltage is applied to the d axis:

$$\Delta I\gamma = \Delta V\delta \cdot t \cdot \Delta I \cdot \sin 2\Delta\theta \qquad (7)$$

$$\Delta I\delta = \Delta V\delta \cdot t \cdot \Delta I \cdot (A \cdot \cos 2\Delta\theta) \qquad (8)$$

where $A=(1/d+1/Lq)/2$ and $\Delta I=(1/Ld-1/Lq)/2$, and $\Delta V\delta$ denotes the absolute value of the predetermined negative voltage. The angular error $\Delta\theta$ of the electrical angle can thus be calculated from the observed electric currents $\Delta I\delta$ and $\Delta I\delta$.

The electrical angle computation unit in the electrical angle detection apparatus of the present invention may apply any one of the available techniques that determine a deviation of the estimated electrical angle from the true electrical angle based on variations in d-axis electric current and q-axis electric current and thereby calculate the electrical angle of the motor. The above calculation is one example of such available techniques.

It is desirable that a negative detection voltage is applied only when the torque command value is not less than a predetermined level.

The structure of the present invention applies a negative voltage to the q axis, which is a main dominant factor of the motor torque. This may cause some decrease in torque in the process of detecting the electrical angle. Application of the negative voltage in the q-axis direction only when the torque command value of the motor is not less than a predetermined level effectively minimizes the torque variation in the course of detection of the electrical angle. The predetermined level of the torque may be specified as the upper limit of the torque command value that allows detection of the electrical angle by another process, for example, by application of a voltage to the d axis. When the torque command value is less than the predetermined level, detection of the electrical angle may follow the conventional method or the method proposed by the applicant of the present invention as disclosed in JAPANESE PATENT LAID-OPEN GAZETTE No. 7-177788.

It is also desirable that at least one of the absolute value of the detection voltage and the time period of voltage application monotonously decreases with a decrease in torque command value.

The inductance Lq in the q-axis direction should be in the linear range A shown in FIG. 12, in order to enable detection of the electrical angle under the high-torque condition. As clearly understood from the graph of FIG. 12, the absolute value of the voltage to be superposed to make the inductance Lq in the q-axis direction in the linear range A varies with a variation in torque required for the motor. By way of example, the voltage to be superposed should have a large absolute value under the torque requirement corresponding to the point c and have a small absolute value under the torque requirement corresponding to the point b. The time period of voltage application has a similar relationship. A decrease in at least one of the absolute value of the detection voltage and the time period of voltage application with a decrease in torque command value required for the motor effectively minimizes the torque variation due to application of the detection voltage to the q axis. The monotonous decrease here includes a linear decrease, a curvilinear decrease, and a stepwise decrease in absolute value of the applied voltage with a decrease in torque command value. Either one of the absolute value of the applied voltage and the time period of voltage application may decrease with a decrease in torque command value, or alternatively the both may decrease.

In accordance with one preferable application of the present invention, the method first applies a predetermined negative voltage in the q-axis direction for a predetermined first time period to be superposed upon the torque voltage and subsequently applies a predetermined positive voltage in the q-axis direction for a predetermined second time period.

This structure enables the q-axis electric current that has decreased in response to application of the negative detection voltage to be recovered quickly to a predetermined level corresponding to the required torque. This effectively suppresses the influence of the torque variation in the course of detection of the electrical angle. The absolute value of the positive detection voltage and the second time period of voltage application should be determined by taking into account this effect. It is not required to make the absolute value of the positive detection voltage and the second time period of voltage application coincident with the absolute value of the negative detection voltage and the first time period of voltage application.

The following describes the case in which a positive voltage is applied to the q axis. In this case, the method detects the electrical angle by taking advantage of the unequivocal relationship between the variation in q-axis electric current and the angular error of the electrical angle illustrated in the graph of FIG. 18. A concrete procedure provides a memory that stores the relationship between the angular error obtained as the deviation of the estimated electrical angle from the true electrical angle and the variation in q-axis electric current corresponding to the detection voltage. The method refers to the stored relationship and reads the angular error corresponding to the observed variation in electric current due to application of the detection voltage in the q-axis direction. The electrical angle is calculated from the angular error thus obtained.

As described previously, the unequivocal relationship is valid under the condition of magnetic saturation. The relationship is stored in advance into the memory, for example, in the form shown in the graph of FIG. 18. The method reads the angular error from the relationship stored in the memory and thereby determines the electrical angle. The relationship shown in FIG. 18 may be stored in the form of a table or in the form of an approximate function.

The reason why there is an unequivocal relationship between the q-axis electric current and the angular error of the electrical angle under the condition of the magnetic flux saturation has not completely been elucidated, but the following is presumed to be the reason. FIG. 19 shows the state of a magnetic filed in the course of detection of the electrical angle. The composite magnetic field occurs in the motor, which is the combination of the magnetic field produced by the permanent magnets on the rotor with the magnetic field produced by the electric currents flowing through the windings. When the estimated electrical angle has no angular error, application of a voltage to the q axis causes a magnetic field expressed by a vector q1 in the q-axis direction as shown in FIG. 19. The combination of the magnetic field of the vector q1 with a magnetic field of the permanent magnets expressed by a vector d1 gives a composite magnetic field expressed by a vector $\phi 1$. The strength of the magnetic field $\phi 1$ is expressed by Equation (9) given below:

$$\phi 1 = \sqrt{(d1^2 + q1^2)} \quad (9)$$

When the estimated electrical angle has an angular error, on the other hand, the applied voltage causes a magnetic field expressed by a vector $\delta 1$ in the $\delta$-axis direction. The combination of the magnetic field of the vector $\delta 1$ with the magnetic field of the permanent magnets expressed by the vector d1 gives a composite magnetic field expressed by a vector $\phi 2$. The supplied electric current in this case is identical with that in the case where the estimated electrical angle has no angular error. The magnitude of the vector q1 is accordingly equal to the magnitude of the vector $\delta 1$. When the magnitudes of these vectors are shown as q1, the strength of the magnetic field $\phi 2$ is expressed by Equation (10) given below:

$$\phi 2 = \sqrt{(d1^2 + q1^2 + 2d1 \cdot q1 \cdot \sin\Delta\theta)} \quad (10)$$

Comparison between Equations (9) and (10) shows that the magnitude of the vector $\phi 2$ is greater than the magnitude of the vector $\phi 1$ when the angular error $\Delta\theta$ is a positive value. This means that the magnetic flux density further increases according to the angular error in the state that the magnetic field causes magnetic saturation (that is, in the range B of FIG. 12). The increase in magnetic flux density in the range B of FIG. 12 decreases the inductance and enhances the flow of electric current. This mechanism may be the reason why there is an equivocal relationship between the q-axis electric current and the angular error as shown in the graph of FIG. 18.

When the method takes advantage of this unequivocal relationship, it is desirable that the detection voltage is positive. A negative detection voltage may, however, be applicable in the range that causes magnetic saturation. Application of a positive voltage causes the q-axis electric current to keep the required level corresponding to the torque command value and thereby prevents the torque deficiency in the course of detection of the electrical angle. One possible modification applies the detection voltage to the q axis only under the high-torque condition that causes magnetic saturation. The conventional method is applied to detect the electrical angle in the other state.

Regulation of the electric currents flowing through the windings based on the electrical angle controls operation of the synchronous motor. The technique regarding the detection of the electrical angle is accordingly applicable to control of the synchronous motor. This technique enables appropriate control of the synchronous motor even when a high torque is required in the state of low-speed operation.

The principle of the present invention is applicable to not only the inner rotor-type synchronous motor, which has a rotor on the center and a stator on the circumference thereof, but also the outer rotor-type synchronous motor. The outer rotor-type synchronous motor has a stator on the center and a ring-shaped outer rotor surrounding the stator. In the outer rotor-type synchronous motor, control electric currents are flown through three-phase coils to form a revolving magnetic field and thereby rotate the ring-shaped outer rotor.

These and other objects, features, aspects, and advantages of the present invention will become more apparent from the following detailed description of the preferred embodiments with the accompanying drawings.

DESCRIPTION OF THE PREFERRED EMBODIMENT

1. Structure of Embodiment

Figure 2:
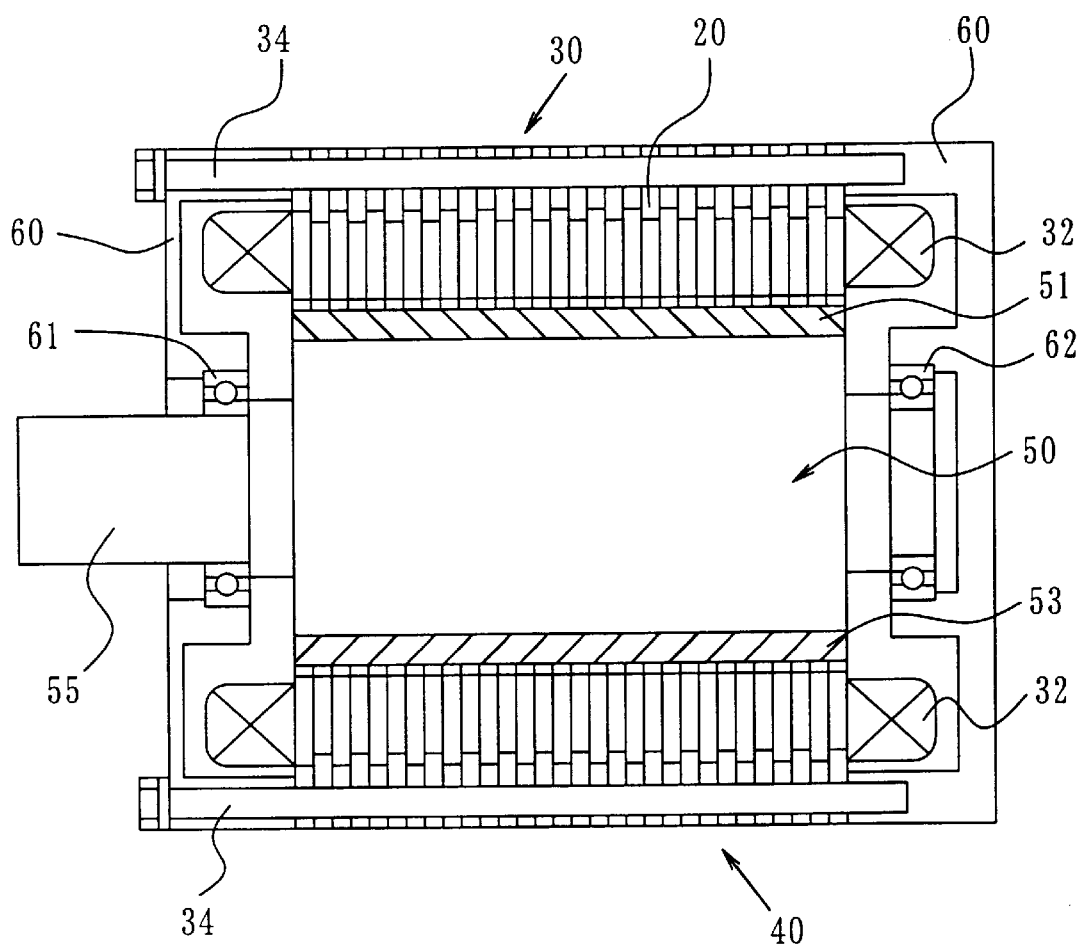
FIG. 2 schematically illustrates the structure of a three-phase synchronous motor 40.

The general structure of a three-phase synchronous motor 40 is described with the drawing of FIG. 2. The three-phase synchronous motor 40 includes a stator 30, a rotor 50, and a casing 60 for accommodating the stator 30 and the rotor 50 therein. The rotor 50 has permanent magnets 51 through 54 attached to the outer circumference thereof and is provided with a rotating shaft 55. The rotating shaft 55 passes through the anal center of the rotor 50 and is rotatably supported by bearings 61 and 62 disposed in the casing 60.

Figure 3:
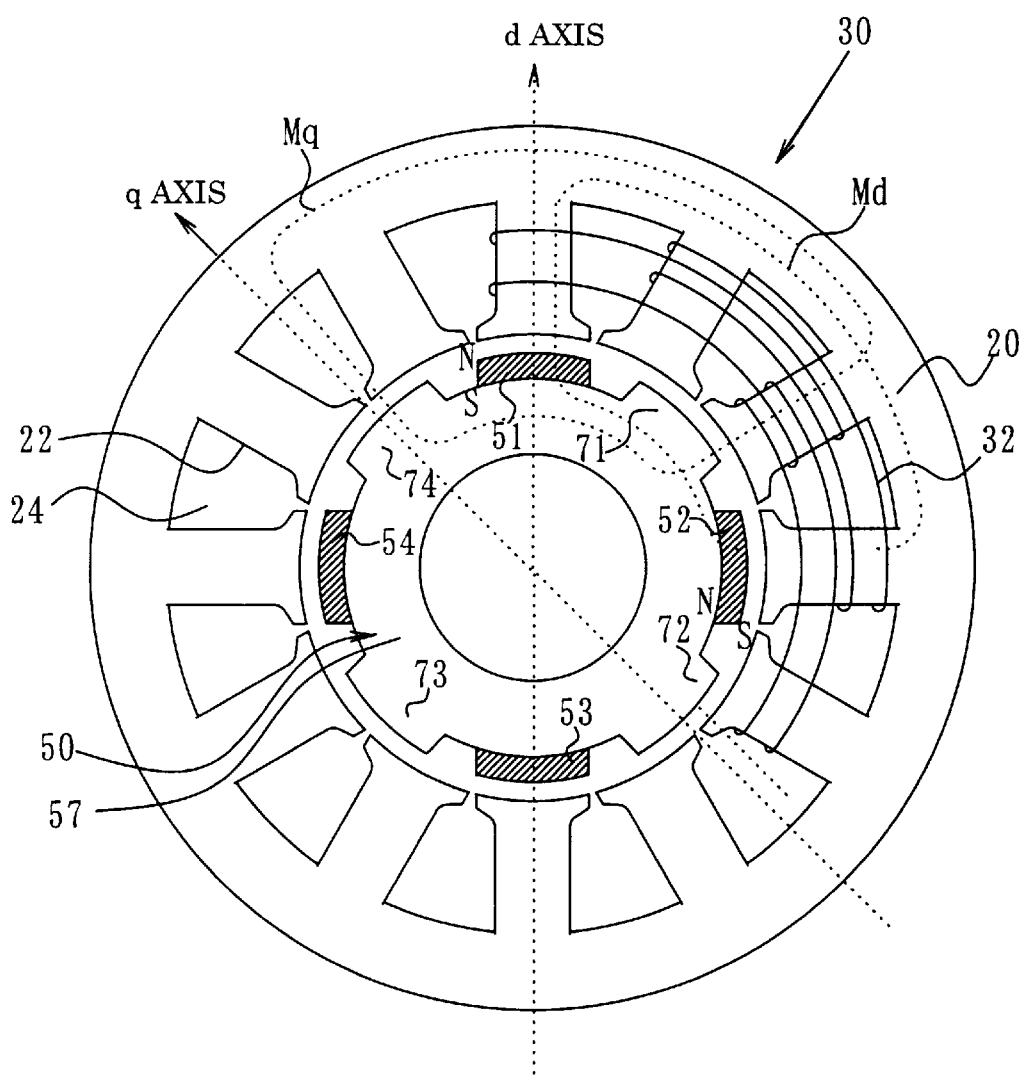
FIG. 3 is an end view showing the positional relationship between a stator 30 and a rotor 50 in the three-phase synchronous motor 40.

The rotor 50 is prepared by laying a plurality of plate-like rotor elements 57, which are punched out of a non-directional electromagnetic steel plate, one upon another. Each rotor element 57 has four salient poles 71 through 74 arranged in a cross configuration as shown in FIG. 3. The rotating shaft 55 is pressed into the laminate of the rotor elements 57, so as to temporarily fix the laminate of the rotor elements 57. Each rotor element 57 composed of the electromagnetic steel plate has an insulating layer and an adhesive layer formed on the surface thereof. The laminate of the rotor elements 57 is heated to a predetermined temperature, which fuses the adhesive layers and thereby fixes the laminate of the rotor elements 57.

After the assembly of the rotor 50, the permanent magnets 51 through 54 are attached to the outer circumferential surface of the rotor 50 along the axis of the rotor 50 at the positions between the salient poles 71 through 74. The permanent magnets 51 through 54 are magnetized in the radial direction of the rotor 50 in such a manner that the adjoining magnets form magnetic poles of different polarities. For example, the outer circumferential face of the permanent magnet 51 forms an N pole, whereas the outer circumferential face of the adjoining permanent magnet 51 forms an S pole. In the state that the rotor 50 is combined with the stator 30, the pair of the permanent magnets 51 and 52 form a magnetic path Md that passes through the rotor elements 57 and stator elements 20 (described below) as shown by the one-dot chain line in FIG. 3.

The stator 30 is prepared by laying a plurality of plate-like stator elements 20, which are punched out of a non-directional electromagnetic steel plate like the rotor elements 57, one upon another. Each stator element 20 has twelve teeth 22 as shown in FIG. 3. Coils 32 for causing the stator 30 to generate a revolving magnetic field are wound on slots 24 formed between the teeth 22. Bolt holes, each of which receives a fixation bolt 34, are formed in the outer circumference of the stator element 20, although being omitted from the illustration of FIG. 3.

The stator 30 is temporarily fixed by heating the laminate of the stator elements 20 under pressure and fusing the adhesive layers thereof. In this state, the coils 32 are wound on the teeth 22 to complete the stator 30. The stator 30 is then placed in the casing 60 and fixed to the casing 60 by fitting the fixation bolts 34 in the bolt holes. The rotor 50 is then rotatably attached to the casing 60 by means of the bearings 61 and 62. This completes the assembly of the three-phase synchronous motor 40.

Figure 4:
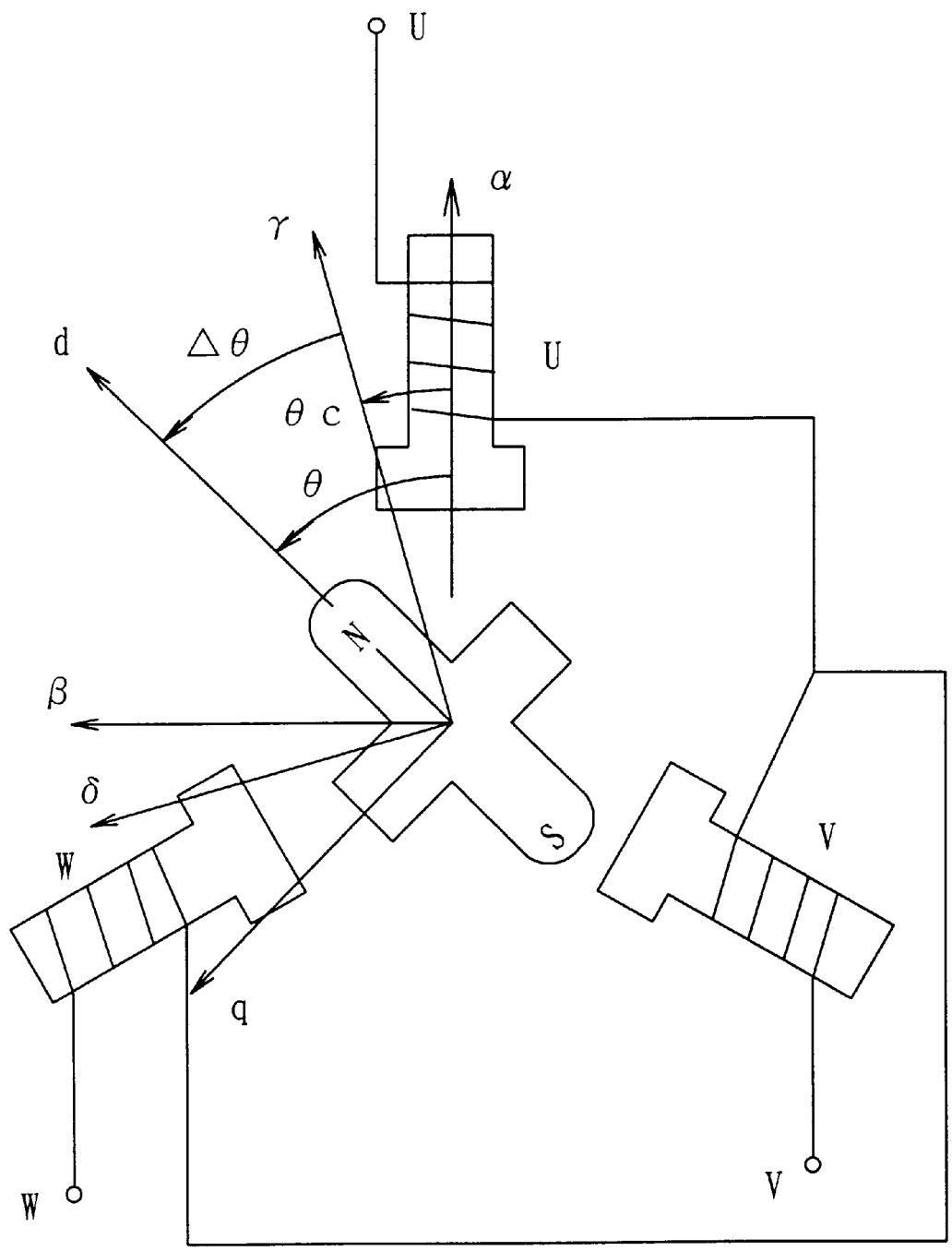
FIG. 4 is an equivalent circuit diagram of the three-phase synchronous motor 40.

When an excitation current is flown to generate a revolving magnetic field on the stator coils 32 of the stator 30, a magnetic path Mq is formed to pass through the adjoining salient poles as well as the rotor elements 57 and the stator elements 20 as shown by the two-dot chain line in FIG. 3. The axis 'd' represents the axis through which the magnetic flux formed by the permanent magnet 52 passes in the radial direction of the rotor 50, whereas the axis 'q' represents the axis through which the magnetic flux formed by the stator coils 32 of the stator 30 passes in the radial direction of the rotor 50. The d axis and the q axis are axes of rotation with rotation of the rotor 50. In this embodiment, the outer circumferential faces of the permanent magnets 51 and 53 attached to the rotor 50 form N poles, whereas the outer circumferential faces of the permanent magnets 52 and 54 form S poles. The geometrical angle of the d axis and the q axis is accordingly 45 degrees as shown in FIG. 3. FIG. 4 shows an equivalent circuit of the three-phase synchronous motor 40 of this embodiment. The three-phase synchronous motor 40 is expressed by an equivalent circuit including three-phase coils of U, V, and W phases and a permanent magnet rotating about an axis of rotation. In the equivalent circuit, the d axis is defined as the axis that passes through the N pole of the permanent magnet as the positive direction, whereas the q axis is defined as the axis that is not only electrically but geometrically perpendicular to the d axis. The electrical angle is given as a rotational angle θ of the axis that passes through the U-phase coil and the d axis.

Figure 1:
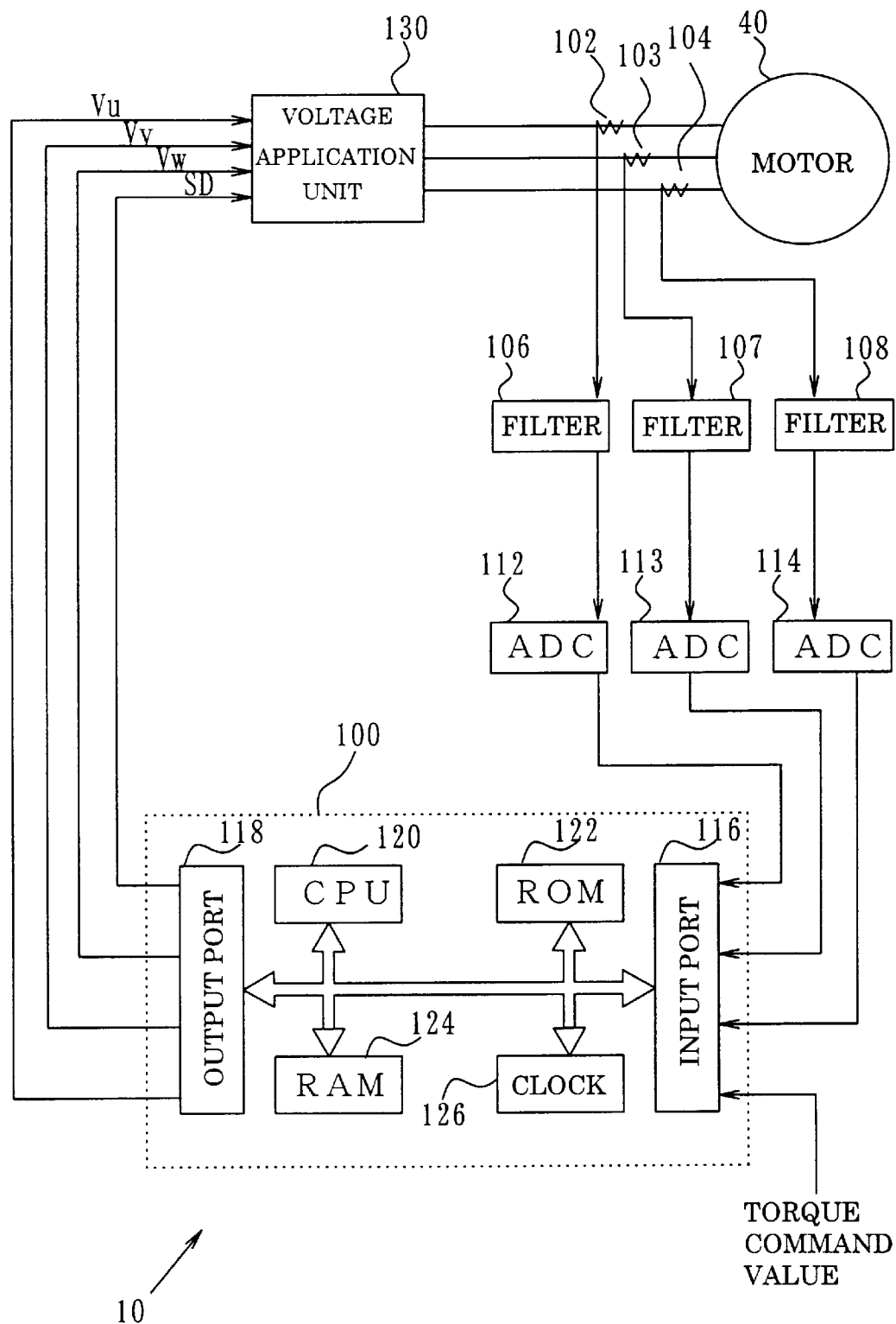
FIG. 1 is a block diagram schematically illustrating the structure of a motor control apparatus 10 as a first embodiment according to the present invention.

FIG. 1 shows the structure of a motor control apparatus 10. The motor control apparatus 10 includes a control ECU 100 that regulates the motor currents supplied to the three phases, U, V, and W phases of the three-phase synchronous motor 40 in response to an external torque instruction, electric current sensors 102, 103, and 104 that respectively measure a U-phase current Au, a V-phase current Av, and a W-phase current Aw of the three-phase synchronous motor 40, filters 106, 107, and 108 that eliminate high-frequency noises from the observed electric currents, and three analogdigital converters (ADC) 112, 113, and 114 that convert the observed electric currents to digital data.

The control ECU 100 includes a microprocessor (CPU) 120 that carries out arithmetic and logic operations, a ROM 122 in which the processing of the CPU 120 and required data are stored in advance, a RAM 124, which data required for the processing are temporarily written in and read from, and a clock 126 that counts the time. These elements are mutually connected via a bus. An input port 116 and an output port 118 are also connected to the bus. The CPU 120 reads the observed electric currents Au, Av, and Aw flowing through the respective phases, U, V, and W phases, of the three-phase synchronous motor 40 via these ports 116 and 118.

The control ECU 100 has a voltage application unit 130 arranged on its output side. The voltage application unit 130 applies voltages between the respective coils of the three-phase synchronous motor 40, so as to obtain the phase currents Au, Av, and Aw of the three-phase synchronous motor 40 determined corresponding to an independently input torque command value. The CPU 120 gives control outputs Vu, Vv, Vw, and SD to the voltage application unit 130, in order to externally regulate the voltages applied to the respective coils of the three-phase synchronous motor 40.

Among the various elements of the motor control apparatus 10 described above, the electric current sensors 102 through 104, the filters 106 through 108, the ADCs 112 through 114, the voltage application unit 130, and the control ECU 100 constitute the electrical angle detection apparatus of the present invention.

2. Motor Currents Control Process

The motor control apparatus 10 of the embodiment controls the electric currents as described below with the drawing of FIG. 4. The flow of the electric current Au through the U phase causes a magnetic field, which passes through the U phase and has the strength that varies with the magnitude of the electric current Au. The U-phase current Au is accordingly expressed as a vector having the direction of the magnetic field and the magnitude Au. In a similar manner, the V-phase current Av and the W-phase current Aw flowing through the V phase and the W phase are expressed as vectors. An arbitrary electric current vector in the plane is given as the sum of electric current vectors in representative two directions. The representative two directions are, for example, a direction α and a direction β shown in FIG. 4. The electric current vector corresponding to a magnetic field occurring in an arbitrary direction in the plane of rotation of the motor is expressed by electric currents Aα and Aβ flowing through the two-phase coils. In accordance with a concrete procedure, the electric currents Aα and Aβ that are equivalent to certain electric currents Au, Av, and Aw are expressed by Equations (11) given below:

$$A\alpha = Au - Av/2 - Aw/2$$

$$A\beta = (\sqrt{3}) \cdot (Aw - Av)/2 \tag{11}$$

In the case where Aα and Aβ are known, on the contrary, the respective phase currents Au, Av, and Aw are determined by Equations (12) given below, based on the condition that the total of the electric currents of the U, V, and W phases is equal to zero (Au+Av+Aw=0).

$$Au = 2(\sqrt{3}-3) \cdot A\alpha/$$

$$Av = (3-\sqrt{3}) \cdot (A\alpha - A\beta)/3$$

$$Aw = (3-\sqrt{3}) \cdot (A\alpha + A\beta)/3 \tag{12}$$

This is the generally known three phase-to-two phase conversion. The following describes the procedure of controlling the electric currents in the three-phase synchronous motor 40 with the electric currents Aα and Aβ after the three phase-to-two phase conversion.

The electric current vectors may be defined with respect to the magnetic fields occurring in the d-axis direction and the q-axis direction of FIG. 4. Magnitudes Ad and Aq of the electric current vectors in the d-axis direction and the q-axis direction are expressed with the electric currents Aα and Aβ in the direction α and the direction β as Equations (13) given below:

$$Ad = A\alpha \cdot \cos\theta + A\beta \cdot \sin\theta$$

$$Aq = -A\alpha \cdot \sin\theta + A\beta \cdot \cos\theta \tag{13}$$

In the case where Ad and Aq are known, in the contrary, Aα and Aβ are determined by Equations (14) given below:

$$A\alpha = Ad \cdot \cos\theta - Aq \cdot \sin\theta$$

$$A\beta = Ad \cdot \sin\theta + Aq \cdot \cos\theta \tag{14}$$

Specification of the electric currents flowing in the d-axis direction and the q-axis direction in the three-phase synchronous motor 40 determines the two-phase electric currents Aα and Aβ according to Equations (14) and the electric currents to be actually flown through the U, V, and W phases according to Equations (12). This also determines the voltages to be applied to the U, V, and W phases. The control of the electric currents in the three-phase synchronous motor 40 is based on this idea. Another possible arrangement directly specifies the relationship between the electric currents in the d-axis direction and the q-axis direction and the U, V, and W phase currents, without using the electric current vectors in the directions α and β. In the following description, for example, the 'd-axis electric current and the q-axis electric current' imply the magnitude of the electric current vectors based on the idea discussed above. When the electric current flowing through the synchronous motor is divided into the d-axis direction and the q-axis direction, the q-axis electric current is a main dominant factor of the torque of the synchronous motor 40 as is generally known.

3. Motor Control Routine under Low-Speed Operation in First Embodiment

Figure 5:
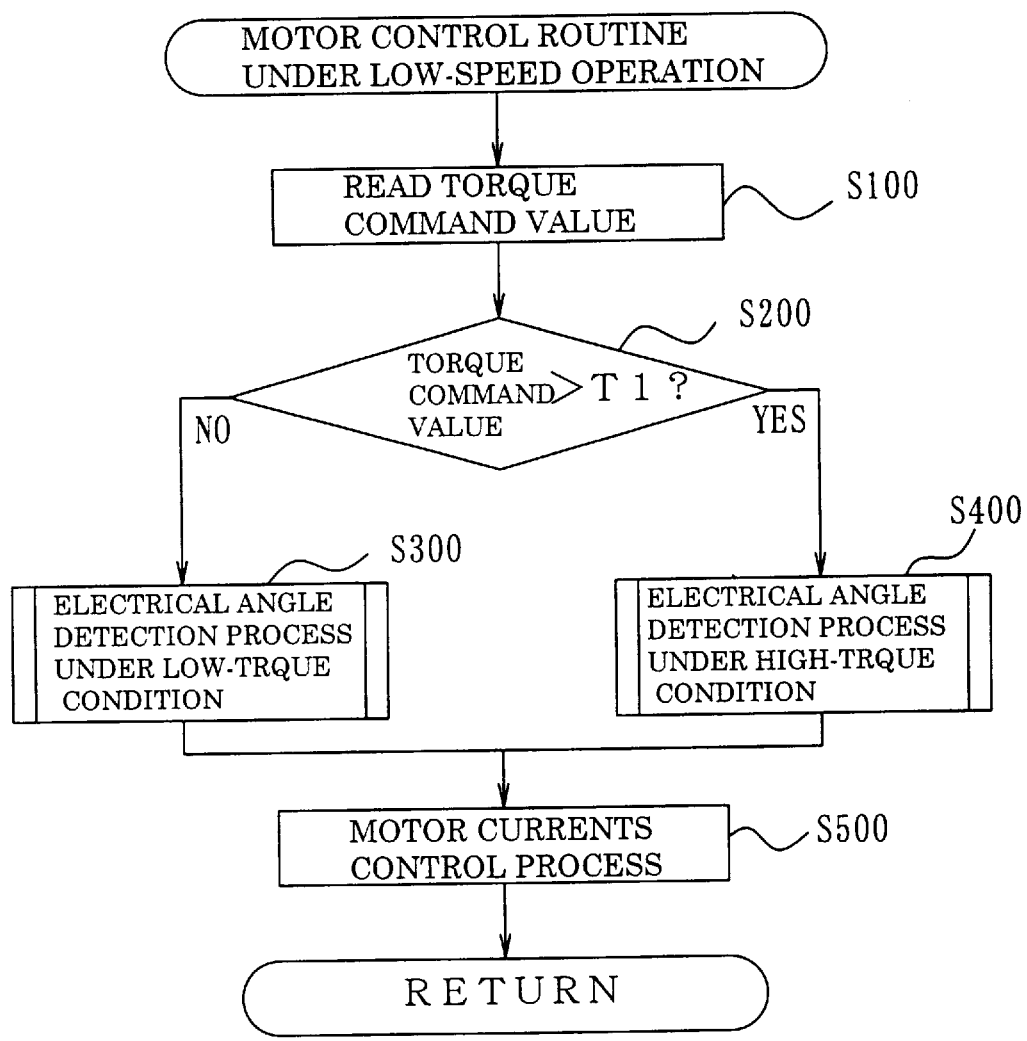
FIG. 5 is a flowchart showing a motor control routine under low-speed operation.

FIG. 5 is a flowchart showing a motor control routine under low-speed operation, which is executed in the first embodiment to control the three-phase synchronous motor 40 that is in the state of low-speed operation. The CPU 120 of the control ECU 100 shown in FIG. 1 periodically executes this motor control routine under low-speed operation together with other control routines (not shown).

When the program enters the motor control routine under low-speed operation shown in the flowchart of FIG. 5, the CPU 120 first reads the torque command value at step S100 and compares the input torque command value with a predetermined torque T1 at step S200. An appropriate process is applied to detect the electrical angle according to the magnitude of the torque command value as discussed later. The torque command value may be input externally via the input port 116 or may be computed by the CPU 120 based on a variety of externally input data. It is desirable to set a hysteresis for the comparison at step S200, in order to prevent chattering in the case where the torque command value is dose to the predetermined torque T1.

The predetermined torque T1 may be determined experimentally as a specific torque, to which an electrical angle detection process under a low-torque condition discussed below is not applicable. In this embodiment, the predetermined torque T1 is set to be a little smaller than the specific torque, in order to assure the detection of the electrical angle.

Figure 6:
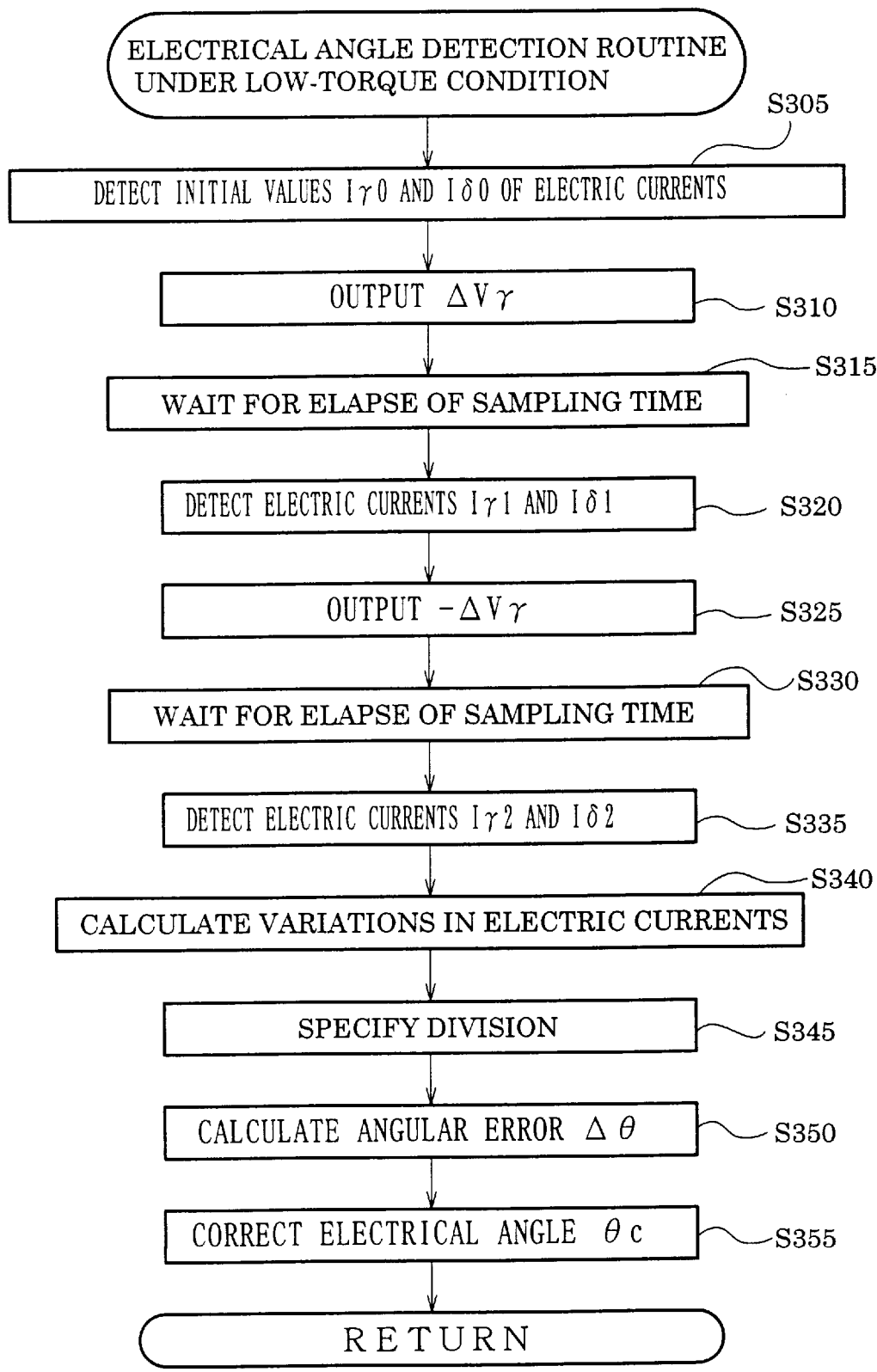
FIG. 6 is a flowchart showing the details of an electrical angle detection process under a low-torque condition executed at step S300 in the flowchart of FIG. 5.
Figure 7:
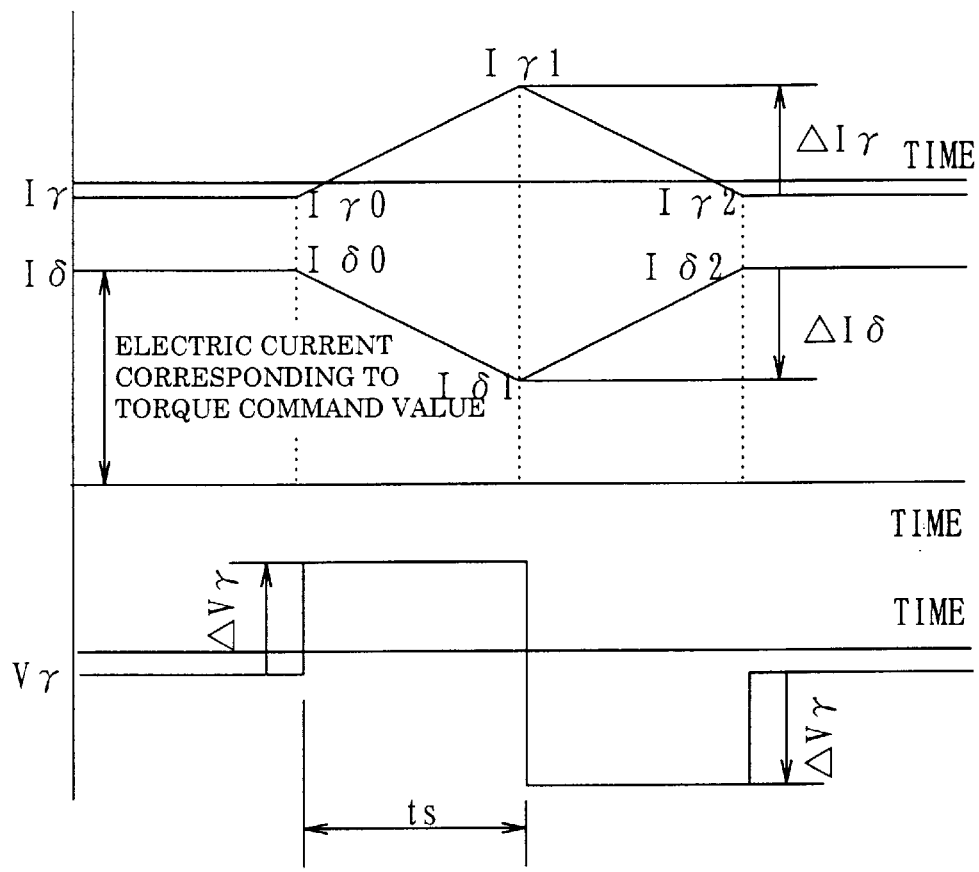
FIG. 7 shows the applied voltage and the observed electric currents in the electrical angle detection process under the low-torque condition.

When the input torque command value is not greater than the predetermined torque T1 at step S200, the CPU 120 executes an electrical angle detection process under a low-torque condition at step S300. The following describes the details of the electrical angle detection process under the low-torque condition with the flowchart of FIG. 6 and the graph of FIG. 7. The flowchart of FIG. 6 shows a routine of the electrical angle detection process under the low-torque condition. The graph of FIG. 7 shows the voltage pulses applied in the direction of a γ axis and the electric currents flowing through the d axis and the q axis in the electrical angle detection process under the low-torque condition.

When the program enters the electrical angle detection routine under the low-torque condition, the CPU 120 first detects initial values Iγ0 and Iδ0 of the electric currents flowing in the directions of a γ axis and a δ axis at step S305. The CPU 120 receives signals output from the electric current sensors 102, 103, and 104, which measure the electric currents of the U, V, and W phases, via the filters 106, 107, and 108, the ADCs 112, 113, and 114, and the input port 116, and converts the input electric currents of the U, V, and W phases into the electric currents in the γ-axis direction and the δ-axis direction based on the arithmetic operations discussed in the section "2. Motor Currents Control Process". Since the d axis and the q axis can be defined only after the determination of the electrical angle of the synchronous motor 40 as shown in FIG. 4, the CPU 120 estimates the γ axis and the δ axis based on an estimated electrical angle θc and determine the electric currents in the γ-axis direction and the δ-axis direction. There is accordingly an angular error Δθ between the estimated electrical angle θc and an actual electrical angle θ as shown in FIG. 4. In the initial state, a positive electric current flows through the δ axis corresponding to the torque command value, whereas a negative electric current flows through the γ axis as shown in the graph of FIG. 7. The flow of the negative electric current through the γ axis, that is, the flow of the electric current in the negative direction of the d axis, causes a positive reluctance torque to occur in the motor that has an inductance Ld in the d-axis direction smaller than an inductance Lq in the q-axis direction, for example, in the synchronous motor 40 of the embodiment.

The CPU 120 then outputs a voltage ΔVγ in the γ-axis direction at step S310, waits for elapse of a sampling time ts at step S315, and detects electric currents Iγ1 and Iδ1 at step S320. The sampling time ts for measuring the electric current is set experimentally as the value that enables a variation in electric current flowing through the coil windings to be detected sufficiently. The conditions to be considered for setting the sampling time will be discussed later. The wait for elapse of the sampling time ts (step S315) is realized by interrupting another routine, which is executed by the CPU 120 for controlling operation of the synchronous motor 40, at every sampling time ts and executing this routine. The voltage ΔVγ applied in the γ-axis direction is superposed upon the voltage applied in the γ-axis direction in the initial state as shown in FIG. 7. This is equivalent to an increase in voltage applied in the γ-axis direction by Δγ.

A voltage is applied in the γ-axis direction since the electric current in the q-axis direction is a main dominant factor of the torque and the electric current in the d-axis direction has a relatively small effect on the torque in the synchronous motor 40 of the embodiment. The flow of the electric current in the γ-axis direction, which is estimated as the d-axis by the control ECU 100, reduces the effect on the torque to a relatively small level in the process of detection of the electrical angle. Although a significant variation in electric current in the δ-axis direction is shown in the graph of FIG. 7 for convenience of explanation, the variation is very small in the actual state.

The CPU 120 subsequently outputs a voltage −ΔVγ in the γ-axis direction at step S325, waits for elapse of the sampling time ts at step S330, and detects electric currents Iγ2 and Iδ2 at step S335. The voltage −ΔVγ applied in the γ-axis direction is superposed upon the voltage in the initial state. As clearly shown in FIG. 7, this is equivalent to subtraction of 2·ΔVγ from the voltage applied in the γ-axis direction at the time point when the electric currents Iγ1 and Iδ1 are detected or to subtraction of ΔVγ from the voltage applied in the initial state.

In this embodiment, the sampling time ts at step S330 is set equal to the sampling time ts at step S315 for the interrupt of another routine executed by the CPU 120. These sampling times may, however, be different from each other. The sampling time may not be a fixed time period but may be a fixed cycle; for example, the electric currents may be detected at the time point when the CPU 120 completes another routine.

The CPU 120 calculates variations in electric currents from the observed electric currents at step S340. A concrete procedure determines variations in electric currents ΔIγ and ΔIδ by respectively averaging variations ΔIγ1 (=Iγ1−Iγ0) and ΔIδ (=Iδ1−Iδ0) between the initial electric currents and the observed electric currents at step S320 and variations ΔIγ2 (=Iγ2−Iγ1) and ΔIδ2 (=Iδ2−Iδ1) between the observed electric currents at step S320 and the observed electric currents at step S335. Averaging the variations in electric currents improves the accuracy of detection of the variations in electric currents. Equations (15) given below are used to calculate the mean variations in electric currents by considering the signs of ΔIγ1, ΔIδ1, ΔIγ2, and ΔIδ2:

$$\Delta I\gamma=(\Delta I\gamma 1-\Delta I\gamma 2)/2$$

$$\Delta I\delta=(\Delta I\delta 1-\Delta I\delta 2)/2 \quad (15)$$

In this embodiment, the sampling times at step S315 and at step 330 are set to the identical fixed value ts, the variations in electric currents ΔIγ and ΔIδ are determined respectively as the means of ΔIγ1 and ΔIγ2 and ΔIδ1 and ΔIδ2. When the sampling times are different from each other, on the other hand, ΔIγ1, ΔIδ1, ΔIγ2, and ΔIδ2 are respectively divided by the sampling times and converted to the rates of change in electric currents, prior to the calculation of the means. In the case where a transistor inverter is applied for the voltage application unit 130 shown in FIG. 1, the dead time loss may cause the time for which the voltage is actually applied to the coil windings to be made longer or shorter than the expected time. In this case, correction equations may be used to determine the accurate variations in electric currents.

As discussed later, the ratio of the variations in electric currents ΔIγ and ΔIδ is required for determination of the electrical angle. One possible modification accordingly omits the processing of steps S325 through S335 from the routine of FIG. 6 and calculates the ratio of the variations in electric currents ΔIγ and ΔIδ only from the observed variations ΔIγ1 and ΔIδ1. This procedure desirably shortens the time required for detection of the electrical angle. This procedure is especially preferable when the errors included in the observed variations ΔIγ1 and ΔIδ1 coincide with each other and can be compensated by calculating the ratio of the variations ΔIγ1 and ΔIδ1.

Figure 8:
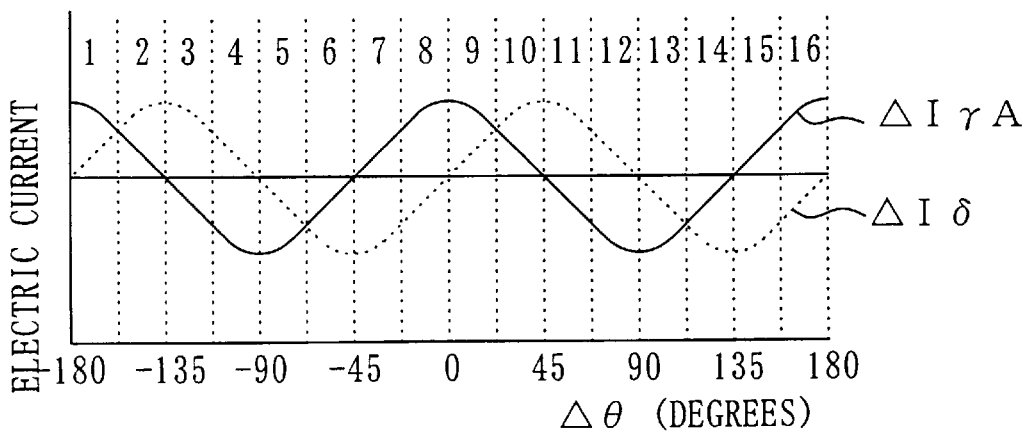
FIG. 8 is a graph showing the observed electric currents plotted against the angular error in the electrical angle detection process under the low-torque condition.

The CPU 120 specifies a division where the angular error Δθ between the estimated electrical angle θc and the actual electrical angle θ exists, based on the calculated variations in electric currents ΔIγ and ΔIδ at step S345. The concrete procedure of specifying the division is described with the graph of FIG. 8. FIG. 8 shows the variations in electric currents plotted against the angular error $\Delta\theta$ ($=\theta-\theta c$) between the electrical angle $\theta c$ estimated by the CPU 120 and the true electrical angle $\theta$. The variations in electric currents $\Delta I\gamma$ and $\Delta I\delta$ are expressed respectively by Equation (3) $\Delta I\gamma=\Delta V\gamma\cdot t(A+\Delta I\cdot\cos2\Delta\theta)$ and Equation (4) $\Delta I\delta=\Delta V\gamma\cdot t\cdot\Delta I\cdot\sin2\Delta\theta$ given above, where $A=(1/Ld+1/Lq)/2$ and $\Delta I=(1/Ld-1/Lq)/2$. When $\Delta I\gamma A=\Delta I\gamma-\Delta V\gamma\cdot t\cdot A$, $\Delta I\gamma A$ is expressed as Equation (16) given below:

$$\Delta I\gamma A = \Delta I\gamma - \Delta V\gamma \cdot t \cdot A \quad (16)$$
$$= \Delta V\gamma \cdot t \cdot \Delta I \cdot \cos2\Delta\theta$$

The plots of FIG. 8 show the variations in electric currents $\Delta I\gamma A$ and $\Delta I\delta$.

The CPU 120 applies the voltage in the $\gamma$-axis direction, so that $\Delta I\delta=0$ when the angular error $\Delta\theta=0$. As explained with Equations (4) and (16), $\Delta I\gamma A$ and $\Delta I\delta$ theoretically vary with variations in the cosine function and the sine function according to the angular error $\Delta\theta$.

The range of $-180$ degrees to 180 degrees where the angular error $\Delta\theta$ may exist is divided into sixteen as divisions 1 through 16 shown in FIG. 8. The division where the angular error $\Delta\theta$ exists is specified according to the positive and negative signs of $\Delta I\gamma A+\Delta I\delta$ and $\Delta I\gamma A-\Delta I\delta$ as follows:

Case 1: when $\Delta I\gamma A+\Delta I\delta>0$ and $\Delta I\gamma A-\Delta I\delta>0$, possible divisions where the angular error exists are divisions 1, 8, 9, and 16;

Case 2: when $\Delta I\gamma A+\Delta I\delta>0$ and $\Delta I\gamma A-\Delta I\delta<0$, possible divisions where the angular error exists are divisions 2, 3, 10, and 11;

Case 3: when $\Delta I\gamma A+\Delta I\delta<0$ and $\Delta I\gamma A-\Delta I\delta<0$, possible divisions where the angular error exists are divisions 4, 5, 12, and 13; and Case 4: when $\Delta I\gamma A+\Delta I\delta<0$ and $\Delta I\gamma A-\Delta I\delta>0$, possible divisions where the angular error exists are divisions 6, 7, 14, and 15.

The CPU 120 subsequently calculates the angular error $\Delta\theta$ corresponding to the specified division at step S350. The angular error $\Delta\theta$ is calculated by approximate equations, which are valid in the range of relatively small $\Delta\theta$ and expressed as Equations (17) through (24) given below corresponding to the respective cases 1 through 4:

Case 1:

$$\Delta\theta=\Delta I\delta/(2\cdot\Delta I\gamma A) \quad (17)$$

$$\Delta\theta=\Delta I\delta/(2\cdot\Delta I\gamma A)+\pi \quad (18)$$

Case 2:

$$\Delta\theta=-\Delta I\gamma A/(2\cdot\Delta I\delta)+\pi/4 \quad (19)$$

$$\Delta\theta=-\Delta I\gamma A/(2\cdot\Delta I\delta)+5\pi/4 \quad (20)$$

Case 3:

$$\Delta\theta=\Delta I\delta/(2\cdot\Delta I\gamma A)+\pi/2 \quad (21)$$

$$\Delta\theta=\Delta I\delta/(2\cdot\Delta I\gamma A)+3\pi/2 \quad (22)$$

Case 4:

$$\Delta\theta=-\Delta I\gamma A/(2\cdot\Delta I\delta)+3\pi/4 \quad (23)$$

$$\Delta\theta=-\Delta I\gamma A/(2\cdot\Delta I\delta)+7\pi/4 \quad (24)$$

There are two equations for calculating the angular error $\Delta\theta$ with respect to each of the cases 1 through 4 (for example, Equations (17) and (18) in the case 1) because of the following reason. In the case 1, the ratio of the variations in electric currents $\Delta I\gamma A$ and $\Delta I\delta$ in the division 1 is identical with that in the division 9 as clearly understood from the graph of FIG. 8. Similarly the ratio in the division 8 is identical with the ratio in the division 16. This means that the calculation only from $\Delta I\gamma A$ and $\Delta I\delta$ gives two solutions that are differentiated from each other by $\pi$.

The technique of the embodiment executes the electrical angle detection process at the cycle that keeps the angular error in the range of $-90$ degrees to 90 degrees. The cycle of executing the electrical angle detection process is accordingly shorter than the time period required for rotating the synchronous motor 40 by 90 degrees. The sampling times ts at steps S315 and S330 in the flowchart of FIG. 6 are set equal to several milliseconds by taking into account this restriction. Because of this prerequisite, the embodiment calculates the electrical angle only with Equations (17), (19), (21), and (23).

One possible application carries out determination of the polarity, that is, determines whether the angular error exists in the range of $-90$ degrees to 90 degrees or in another range, in addition to the electrical angle detection process of the embodiment. A variety of techniques may be adopted for determination of the polarity. Available examples include the techniques disclosed in JAPANESE PATENT LAID-OPEN GAZETTE No. 7-177788 by the applicant of the present invention. Determination of the polarity enables the angular error to be unequivocally determined in the range of $-180$ degrees to 180 degrees.

The CPU 120 subsequently corrects the estimated electrical angle $\theta c$ with the calculated angular error $\Delta\theta$ at step S355. A concrete procedure sets the sum of $\theta c$ and $\Delta\theta$ to the corrected electrical angle $\theta c$. The program completes the electrical angle detection process under the low-torque condition at step S300 and returns to the motor control routine under low-speed operation shown in the flowchart of FIG. 5. The CPU 120 carries out the motor currents control process based on the detected electrical angle at step S500. As described in (2) Motor Currents Control Process, the CPU 120 determines the d-axis electric current and the q-axis electric current to be flown through the synchronous motor 40 corresponding to the torque command value and carries out the two phase-to-three phase conversion, that is, converts the d-axis electric current and the q-axis electric current into the electric currents to be flown through the U, V, and W phases.

Figure 9:
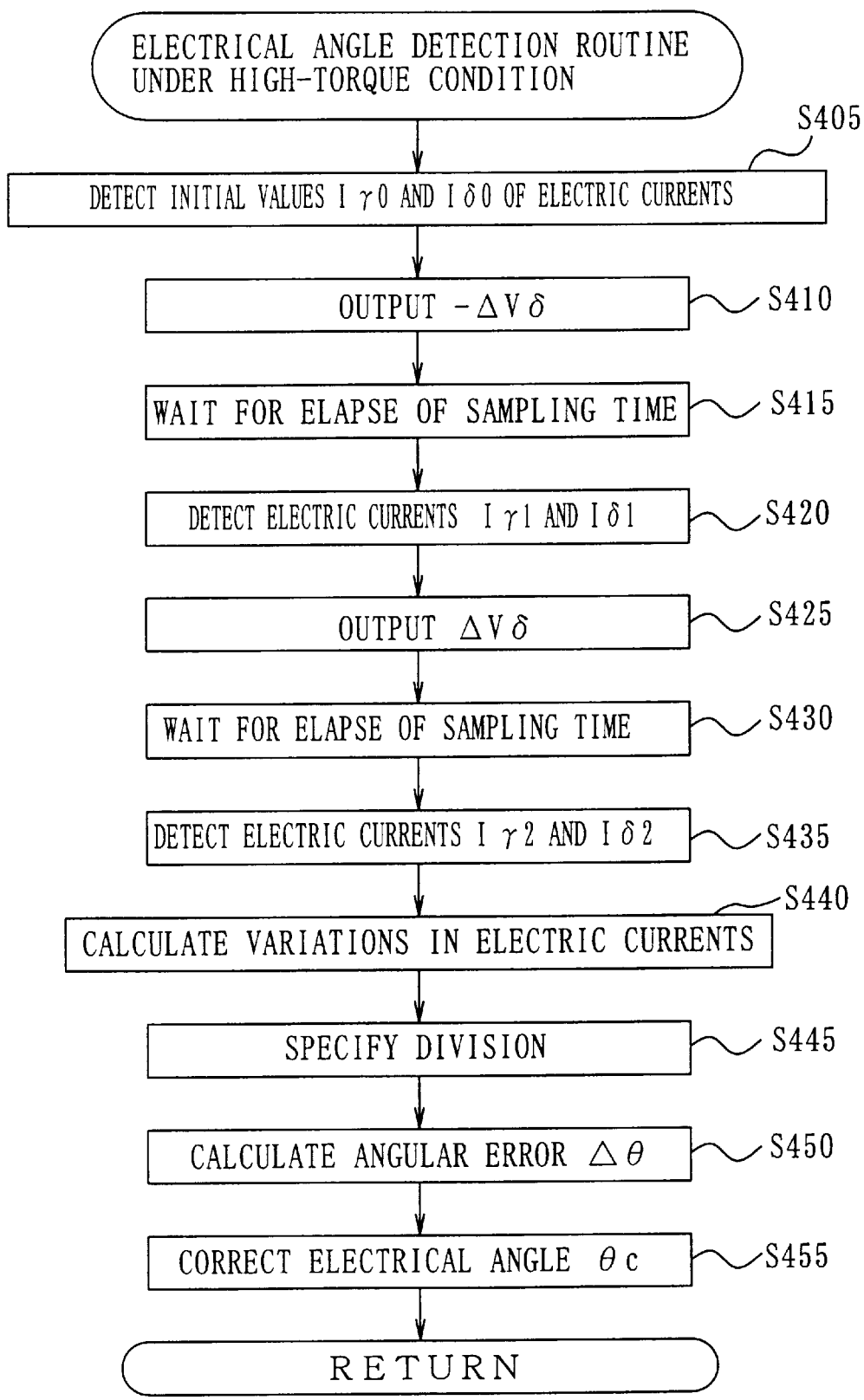
FIG. 9 is a flowchart showing the details of an electrical angle detection process under a high-torque condition executed at step S400 in the flowchart of FIG. 5.
Figure 10:
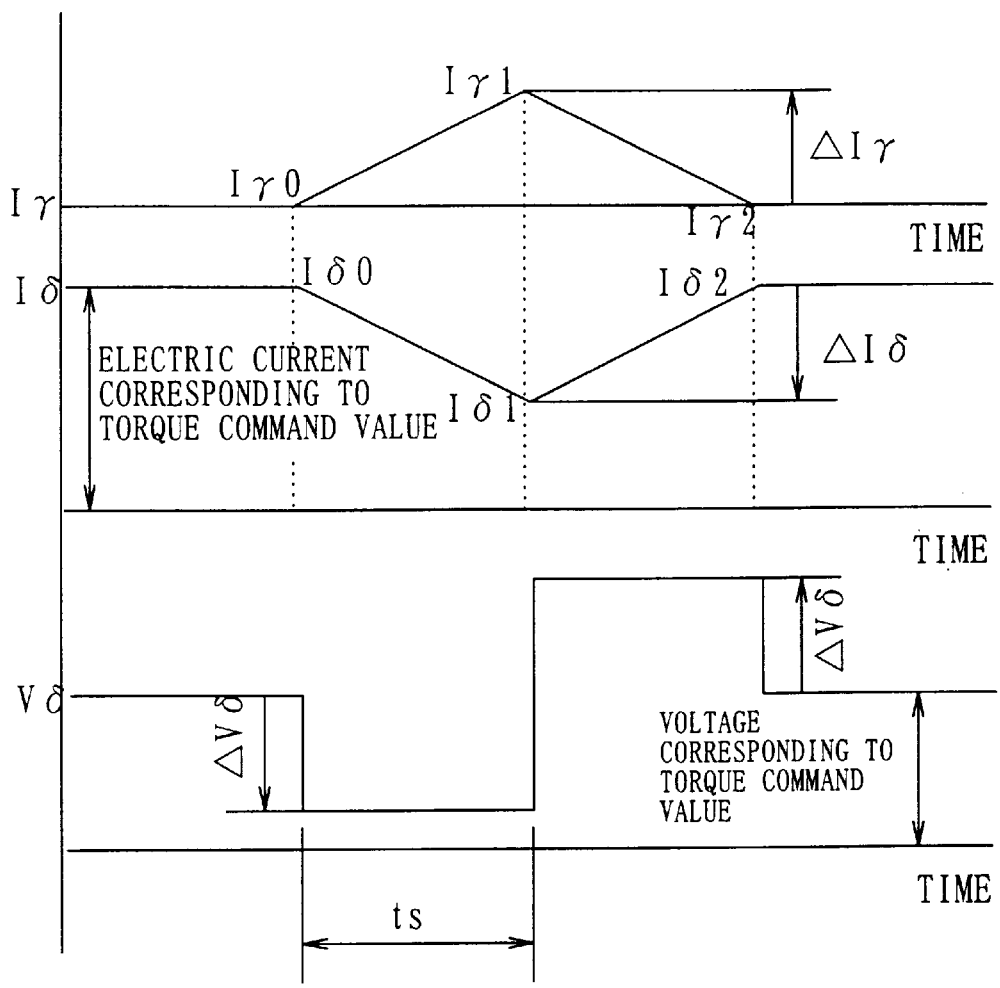
FIG. 10 shows the applied voltage and the observed electric currents in the electrical angle detection process under the high-torque condition.

When the input torque command value is greater than the predetermined torque T1 at step S200, the CPU 120 executes an electrical angle detection process under a high-torque condition at step S400. The electrical angle detection process under the low-torque condition discussed above can not detect the electrical angle with a high accuracy under the high-torque condition. The following describes the details of the electrical angle detection process under the high-torque condition with the flowchart of FIG. 9 and the graph of FIG. 10. The flowchart of FIG. 9 shows a routine of the electrical angle detection process under the high-torque condition. The graph of FIG. 10 shows the voltage pulses applied in the direction of the $\delta$ axis and the electric currents flowing through the d axis and the q axis in the electrical angle detection process under the high-torque condition.

When the program enters the electrical angle detection routine under the high-torque condition, the CPU 120 first detects initial values $I\gamma0$ and $I\delta0$ of the electric currents flowing in the directions of the $\gamma$ axis and the $\delta$ axis at step S405, and applies a voltage $-\Delta V\delta$ to the $\delta$ axis at step S410.

This is equivalent to superposition of a negative voltage $-\Delta N\delta$ upon the initial voltage or subtraction of $\Delta V\delta$ from the initial voltage. Whereas a positive voltage is superposed and applied to the $\gamma$ axis in the electrical angle detection routine under the low-torque condition, a negative voltage is superposed and applied to the $\delta$ axis in the electrical angle detection routine under the high-torque condition.

Figure 12:
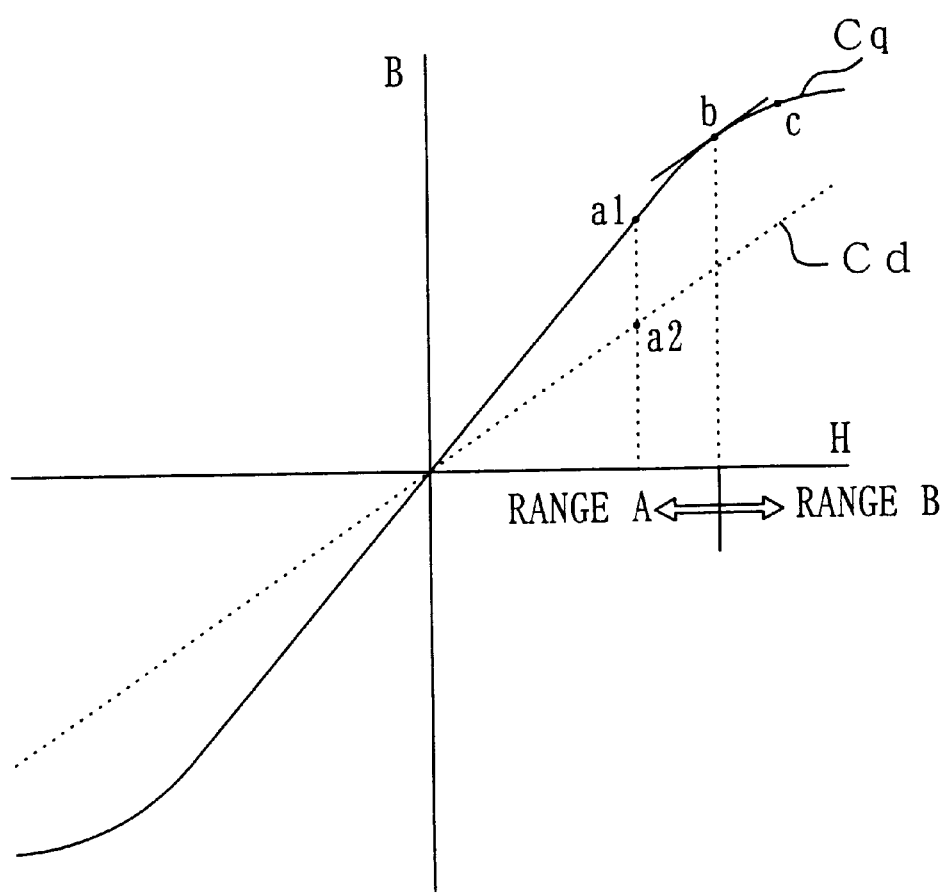
FIG. 12 is a graph showing the magnetic saturation characteristics of the three-phase synchronous motor 40.

When a high torque is required, a large electric current flows in the direction of the $\delta$ axis in the initial state. This causes magnetic saturation and makes the inductance Lq in the q axis smaller than the inductance Ld in the d axis. FIG. 12 is a graph showing a variation in magnetic flux density B plotted against an external magnetic field H including electric currents. In the graph of FIG. 12, the slope of the tangent at each point of a curve Cq corresponding to the q axis and the slope of the tangent at each point of a curve Cd corresponding to the d axis respectively represent the inductances Lq and Ld. In the initial state under the high-torque condition, Cq exists in a nonlinear area B. Superposition of a negative voltage upon the initial voltage in the $\delta$ axis, which is estimated as the q axis by the control ECU 100, relieves the magnetic saturation in the q axis and shifts the curve Cq to a linear range A. This enables detection of the electrical angle.

The CPU 120 waits for elapse of the sampling time ts at step S415, and detects the electric currents $I\gamma 1$ and $I\delta 1$ in the directions of the $\gamma$ axis and the $\delta$ axis at step S420. Although the sampling time ts in this routine is identical with the sampling time ts in the electrical angle detection routine under the low-torque condition, they may be different from each other.

The CPU 120 subsequently outputs a voltage $\Delta V\delta$ in the $\delta$-axis direction at step S425, waits for elapse of the sampling time ts at step S430, detects the electric currents $I\gamma 2$ and $I\delta 2$ in the directions of the $\gamma$ axis and the $\delta$ axis at step S435, and calculates the variations in electric currents $\Delta I\gamma$ and $\Delta I\delta$ from the observed electric currents at step S440. Calculation of the variations in electric currents at step S440 follows the processing at step S340 in the electrical angle detection routine under the low-torque condition shown in the flowchart of FIG. 6.

As described in the electrical angle detection process under the low-torque condition, only the ratio of the variations in electric currents $\Delta I\gamma$ and $\Delta I\delta$ is used for detection of the electrical angle. One possible modification accordingly omits the processing of steps S425 through S435 from the routine of FIG. 9 and calculates the ratio of the variations in electric currents $\Delta I\gamma$ and $\Delta I\delta$ only from the initial electric currents $I\gamma 0$ and $I\delta 0$ obtained at step S405 and the electric currents $I\gamma 1$ and $I\delta 0$ obtained at step S420. In the electrical angle detection process under the high-torque condition, while a positive voltage is applied at step S425 and S430, magnetic saturation may occur again in the q-axis direction, which causes the electric current in the $\delta$-axis direction to be varied in a nonlinear manner. In some cases, it is preferable to omit the processing of steps S425 through S435, in order to avoid this possibility.

Figure 11:
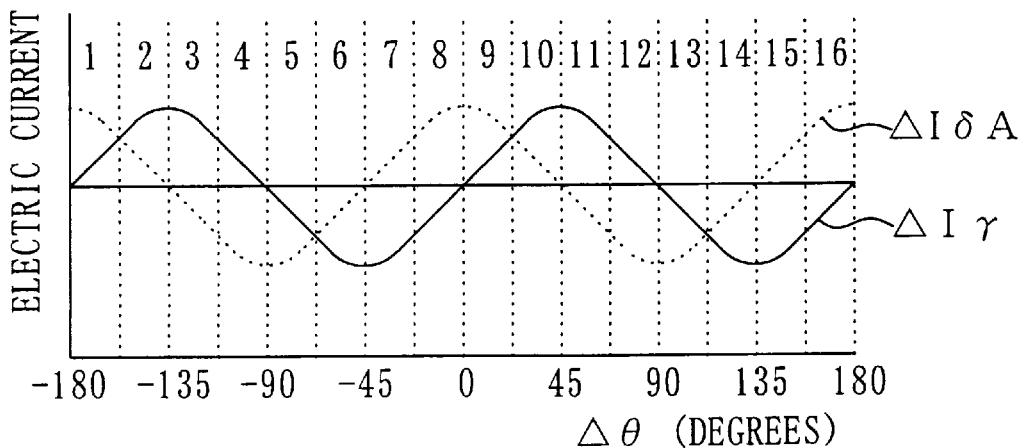
FIG. 11 is a graph showing the observed electric currents plotted against the angular error in the electrical angle detection process under the high-torque condition.

The CPU 120 specifies a division where the angular error $\Delta\theta$ exists, based on the calculated variations in electric currents $\Delta I\gamma$ and $\Delta I\delta$ at step S445. The concrete procedure of specifying the division is different from that adopted in the electrical angle detection routine under the low-torque condition and described with the graph of FIG. 11. FIG. 11 shows the variations in electric currents plotted against the angular error $\Delta\theta$ ($=\theta-\theta c$) between the electrical angle $\theta c$ estimated by the CPU 120 and the true electrical angle $\theta$. The variations in electric currents $\Delta I\gamma$ and $\Delta I\delta$ are expressed respectively by Equation (7) $\Delta I\gamma = \Delta V\delta \cdot t \cdot \Delta I \cdot \sin 2\Delta\theta$ and Equation (8) $\Delta I\delta = \Delta V\delta \cdot t \cdot \Delta I \cdot (A-\cos 2\Delta\theta)$ given above, where $A=(1/Ld+1/Lq)/2$ and $\Delta I=(1/Ld-1/Lq)/2$. When $\Delta I\delta A = \Delta V\delta \cdot t \cdot A - \Delta I\delta$, $\Delta I\delta A$ is expressed as Equation (25) given below:

$$\Delta I\delta A = \Delta V\delta \cdot t \cdot A - \Delta I\delta \qquad (25)$$
$$= \Delta V\delta \cdot t \cdot \Delta I \cdot \cos 2\Delta\theta$$

The plots of FIG. 11 show the variations in electric currents $\Delta I\gamma$ and $\Delta I\delta A$.

The CPU 120 applies the voltage in the $\delta$-axis direction, so that $\Delta I\gamma = 0$ when the angular error $\Delta\theta = 0$. As explained with Equations (7) and (25), $\Delta I\gamma$ and $\Delta I\delta A$ theoretically vary with variations in the sine function and the cosine function according to the angular error $\Delta\theta$.

The range of $-180$ degrees to $180$ degrees where the angular error $\Delta\theta$ may exist is divided into sixteen as divisions 1 through 16 shown in FIG. 11. The division where the angular error $\Delta\theta$ exists is specified according to the positive and negative signs of $\Delta I\gamma + \Delta I\delta A$ and $\Delta I\gamma - \Delta I\delta A$ as follows:

Case 1: when $\Delta I\gamma + \Delta I\delta A > 0$ and $\Delta I\gamma - \Delta I\delta A > 0$, possible divisions where the angular error exists are divisions 2, 3, 10, and 11;

Case 2: when $\Delta I\gamma + \Delta I\delta A > 0$ and $\Delta I\gamma - \Delta I\delta A < 0$, possible divisions where the angular error exists are divisions 1, 8, 9, and 16;

Case 3: when $\Delta I\gamma + \Delta I\delta A < 0$ and $\Delta I\gamma - \Delta I\delta A < 0$, possible divisions where the angular error exists are divisions 6, 7, 14, and 15; and Case 4: when $\Delta I\gamma + \Delta I\delta A < 0$ and $\Delta I\gamma - \Delta I\delta A > 0$, possible divisions where the angular error exists are divisions 4, 5, 12, and 13.

The CPU 120 subsequently calculates the angular error $\Delta\theta$ corresponding to the specified division at step S450. The angular error $\Delta\theta$ is calculated by approximate equations, which are valid in the range of relatively small $\Delta\theta$ and expressed as Equations (26) through (33) given below corresponding to the respective cases 1 through 4:

Case 1:

$$\Delta\theta = \Delta I\gamma/(2 \cdot \Delta I\delta A) + \pi/4 \qquad (26)$$
$$\Delta\theta = \Delta I\gamma/(2 \cdot \Delta I\delta A) + 5\pi/4 \qquad (27)$$

Case 2:

$$\Delta\theta = -\Delta I\delta A/(2 \cdot \Delta I\gamma) \qquad (28)$$
$$\Delta\theta = -\Delta I\delta A/(2 \cdot \Delta I\gamma) + \pi \qquad (29)$$

Case 3:

$$\Delta\theta = \Delta I\gamma/(2 \cdot \Delta I\delta A) + 3\pi/4 \qquad (30)$$
$$\Delta\theta = \Delta I\gamma/(2 \cdot \Delta I\delta A) + 7\pi/4 \qquad (31)$$

Case 4:

$$\Delta\theta = -\Delta I\delta A/(2 \cdot \Delta I\gamma) + \pi/2 \qquad (32)$$
$$\Delta\theta = -\Delta I\delta A/(2 \cdot \Delta I\gamma) + 3\pi/2 \qquad (33)$$

Like the electrical angle detection process under the low-torque condition, there are two equations for calculating the electrical angle with respect to each of the cases 1 through 4. The technique of this embodiment sets an appropriate value to the cycle for executing the electrical angle detection routine under the high-torque condition and determines the electrical angle only with Equations (26), (28), (30), and (32). As described previously, one possible application carries out determination of the polarity, which enables the electrical angle to be determined unequivocally in the range of −180 degrees to 180 degrees.

The CPU 120 subsequently corrects the estimated electrical angle θc with the calculated angular error Δθ at step S455. The program completes the electrical angle detection process under the high-torque condition at step S400 and returns to the motor control routine under low-speed operation shown in the flowchart of FIG. 5. The CPU 120 carries out the motor currents control process based on the detected electrical angle at step S500. The details of the motor currents control process have been discussed previously.

As a matter of convenience, the motor currents control process and the electrical angle detection process are collectively shown in one flowchart and assumed to be carried out at an identical cycle. In the actual state, however, the motor currents control process is executed more frequently than the electrical angle detection process, in order to attain the smooth rotation of the synchronous motor 40. In this embodiment, the frequency of the motor currents control process is four times the frequency of the electrical angle detection process. The motor currents control without the electrical angle detection is based on the electrical angle, which is determined by interpolating the observed variations of the electrical angle. The method of interpolation is described with the drawing of FIG. 13.

Figure 13:
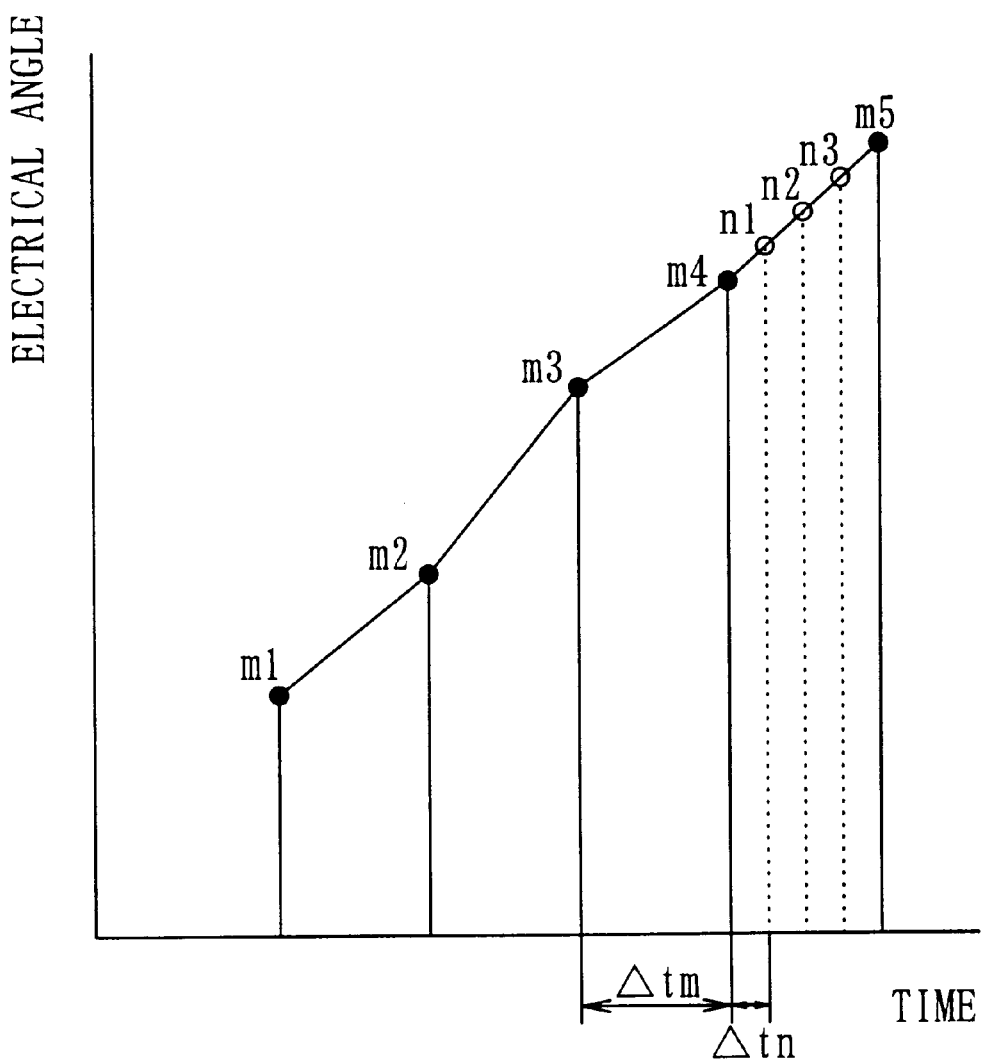
FIG. 13 shows the timing of the motor current control process.

The graph of FIG. 13 shows an increase in electrical angle with an elapse of time when the synchronous motor 40 is at a low-speed rotation. The electrical angle detection process is carried out at points m1 through m5, which are shown by the closed circles and are arranged at time intervals Δtm. The electrical angle detection process is not carried out but only the motor currents control process is carried out at points n1 through n3, which are shown by the open circles and are arranged at time intervals Δtn. In this embodiment, Δtm= 4×Δtn.

An electrical angle N1 at the point n1 should be determined to execute the motor currents control at the point n1. The method of this embodiment calculates the electrical angle N1 according to an equation of N1=Δmav×tn+M4, where Δmav denotes a mean rate of change of the electrical angle calculated from the data at the points m1 through m4 in FIG. 13, Δtn denotes the time interval, and M4 denotes an electrical angle at the point m4. In a similar manner, electrical angles at the points n2 and n3 are calculated using 2×Δtn and 3×Δtn, instead of Δtn.

The mean rate of change of the electrical angle Δmav is the mean of a rate of variation of the electrical angle Δm1 between the points m1 and m2, a rate of change of the electrical angle Δm2 between the points m2 and m3, and a rate of change of the electrical angle Δm3 between the points m3 and m4. Namely Δmav=(Δm1+Δm2+Δm3)/3. The rate of change of the electrical angle is obtained by dividing a variation in electrical angle in each division by the time interval Δtm, and corresponds to the mean angular velocity of the synchronous motor 40 in the division. Such interpolation enables the electrical angle to be estimated at the point m5, which is the next timing of electrical angle detection. The electrical angle thus estimated is θc shown in FIG. 4.

The motor currents control carried out at the higher frequency than that of the electrical angle detection enables the operation of the synchronous motor 40 to be controlled smoothly although the electrical angles at the points n1 through n3 include some errors. The number of points, for example, m1, m2, . . . , used for calculating the interval of the motor currents control and the mean rate of change of the electrical angle are determined appropriately according to the accuracy of estimation of the electrical angle required for the motor currents control and the processing speed of the CPU 120.

The electrical angle detection apparatus and the motor control apparatus 10 described above can detect the electrical angle with a high accuracy and appropriately control the synchronous motor 40 even under the condition of a high torque command value while the motor 40 is in the state of low-speed operation. There is a possibility of an instantaneous torque decrease due to application of a negative voltage in the q-axis direction, which is a main dominant factor of the torque of the motor 40 in the electrical angle detection process under the high-torque condition (step S400 in the flowchart of FIG. 5). The voltage is applied in the q-axis direction, however, only when the input torque command value is greater than the predetermined torque T1. This arrangement of the embodiment effectively reduces such a torque variation to the minimum level.

The electrical angle detection process is completed within a very short time period. One possible modification omits the comparison between the input torque command value and the predetermined torque T1 (step S200 in the flowchart of FIG. 5) and detects the electrical angle according to the electrical angle detection routine under the high-torque condition (step S400 in the flowchart of FIG. 5) irrespective of the magnitude of the torque command value. Another possible modification carries out both the electrical angle detection process under the low-torque condition and the electrical angle detection process under the high-torque condition irrespective of the magnitude of the torque command value, and selects the appropriate one out of both the results of the operations, in order to enable the observed electrical angle of the motor 40 to continuously vary. This modified structure is effective for stably detecting the electrical angle in the case where the input torque command value is dose to the predetermined torque T1, that is, in the transient range between the electrical angle detection process under the low-torque condition and the electrical angle detection process under the high-torque condition shown in the flowchart of FIG. 5. Both the electrical angle detection routines may be carried out only in such a transient range.

As shown in the graph of FIG. 10, the electrical angle detection apparatus of the embodiment first applies a negative voltage to the q axis to be superposed upon the initial voltage and then applies and superposes a positive voltage in the electrical angle detection process under the high-torque condition. This arrangement enables the q-axis electric current decreased by application of the negative voltage to be quickly recovered to a predetermined level corresponding to the required torque, thereby suppressing the effect of the torque variation in the process of detecting the electrical angle. With a view to calculating the rate of change of the electric current with a high accuracy, the positive voltage applied at step S425 and the negative voltage applied at step S410 in the flowchart of FIG. 9 have an identical absolute value and an identical time period of voltage application. The absolute value and the time period of voltage application may, however, be appropriately set for the positive voltage, in order to interfere with the torque variation.

Another possible modification may vary either the applied voltage ΔVδ or the time period of voltage application according to the torque command value in the electrical angle detection process under the high-torque condition executed by the electrical angle detection apparatus. In accordance with a concrete procedure of this modified structure, a large value is set to the applied voltage $\Delta V\delta$ when the torque command value significantly exceeds the predetermined torque (a point c in the graph of FIG. 1 2). The applied voltage $\Delta V\delta$ decreases with a decrease in torque command value (a point b in the graph of FIG. 12).

Figure 14:
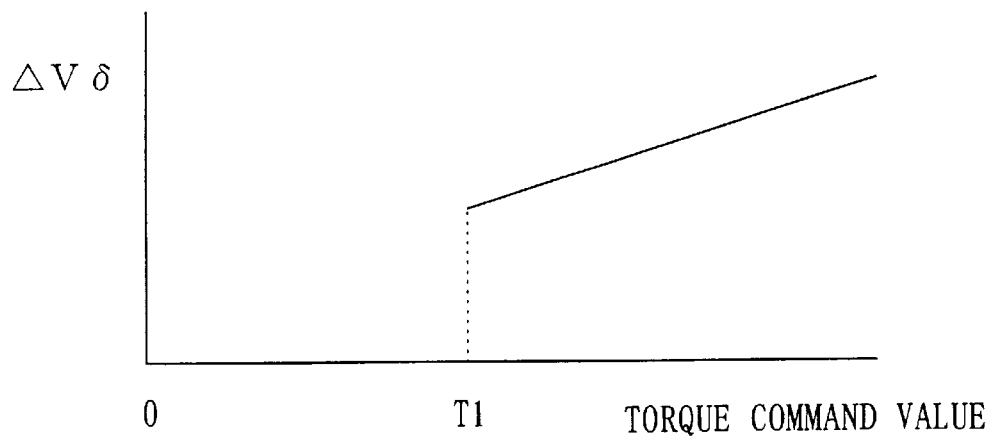
FIG. 14 is a graph showing a first relationship between the torque command value and the applied voltage Δδ.
Figure 15:
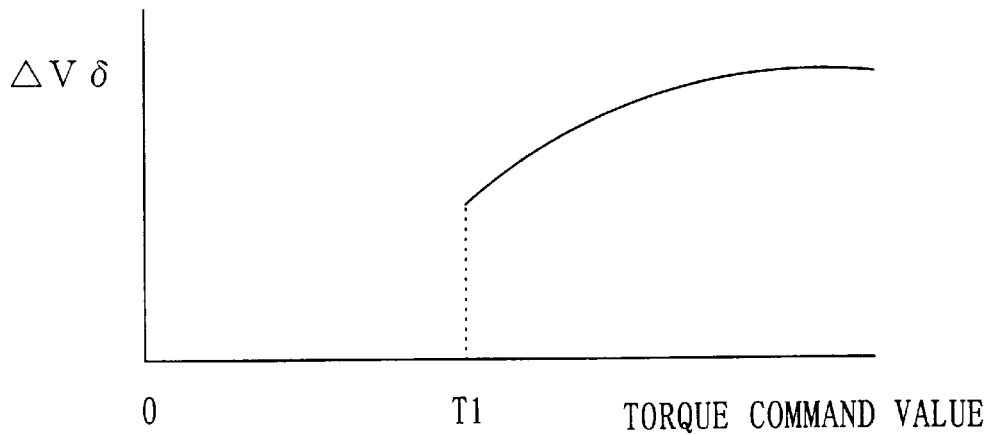
FIG. 15 is a graph showing a second relationship between the torque command value and the applied voltage Δδ.
Figure 16:
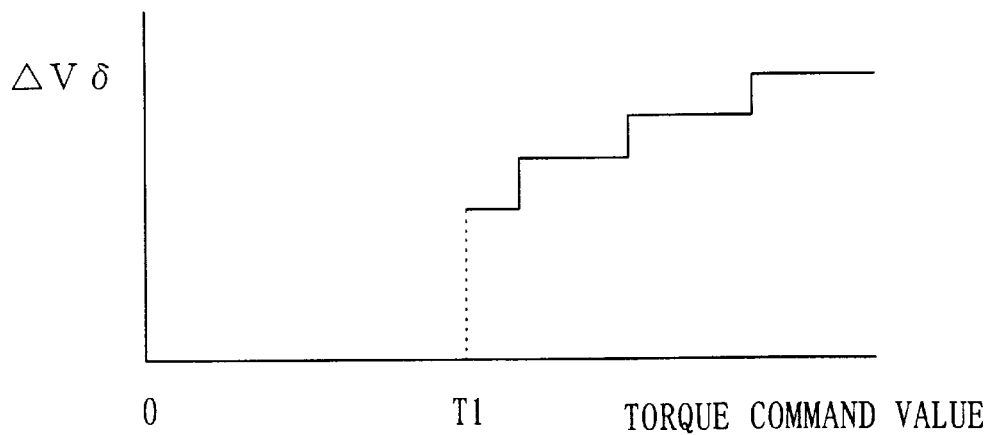
FIG. 16 is a graph showing a third relationship between the torque command value and the applied voltage to Δδ.

FIGS. 14 through 16 show the relationships between the torque command value and the applied voltage $\Delta V\delta$. In the graph of FIG. 14, the absolute value of the applied voltage linearly decreases with a decrease in torque command value. In the graph of FIG. 15, the absolute value of the applied voltage decreases curvilinearly with a decrease in torque command value. In the graph of FIG. 16, the absolute value of the applied voltage decreases stepwise with a decrease in torque command value. In any case, either one of the absolute value of the applied voltage and the time period of voltage application may be decreased, or alternatively both may be decreased.

In the electrical angle detection apparatus and the motor control apparatus 10, at least one of the absolute value of the applied voltage and the time period of voltage application is decreased with a decrease in torque command value required for the motor 40. This structure enables the inductance of the q axis under the high-torque condition to be shifted to a linear range (the range A in the graph of FIG. 12) by application of a minimum required voltage. This accordingly minimizes the torque variation due to application of the negative voltage to the q axis.

4. Motor Control Routine under Low-Speed Operation in Second Embodiment

The following describes a second embodiment according to the present invention. The electrical angle detection apparatus and the motor control apparatus 10 of the second embodiment have the identical hardware structure with that of the first embodiment. The general flow of the motor control routine under low-speed operation in the second embodiment is also similar to that in the first embodiment and follows the flowchart of FIG. 5. The only difference of the second embodiment from the first embodiment is the electrical angle detection process under the high-torque condition (step S400 in the flowchart of FIG. 5).

Figure 17:
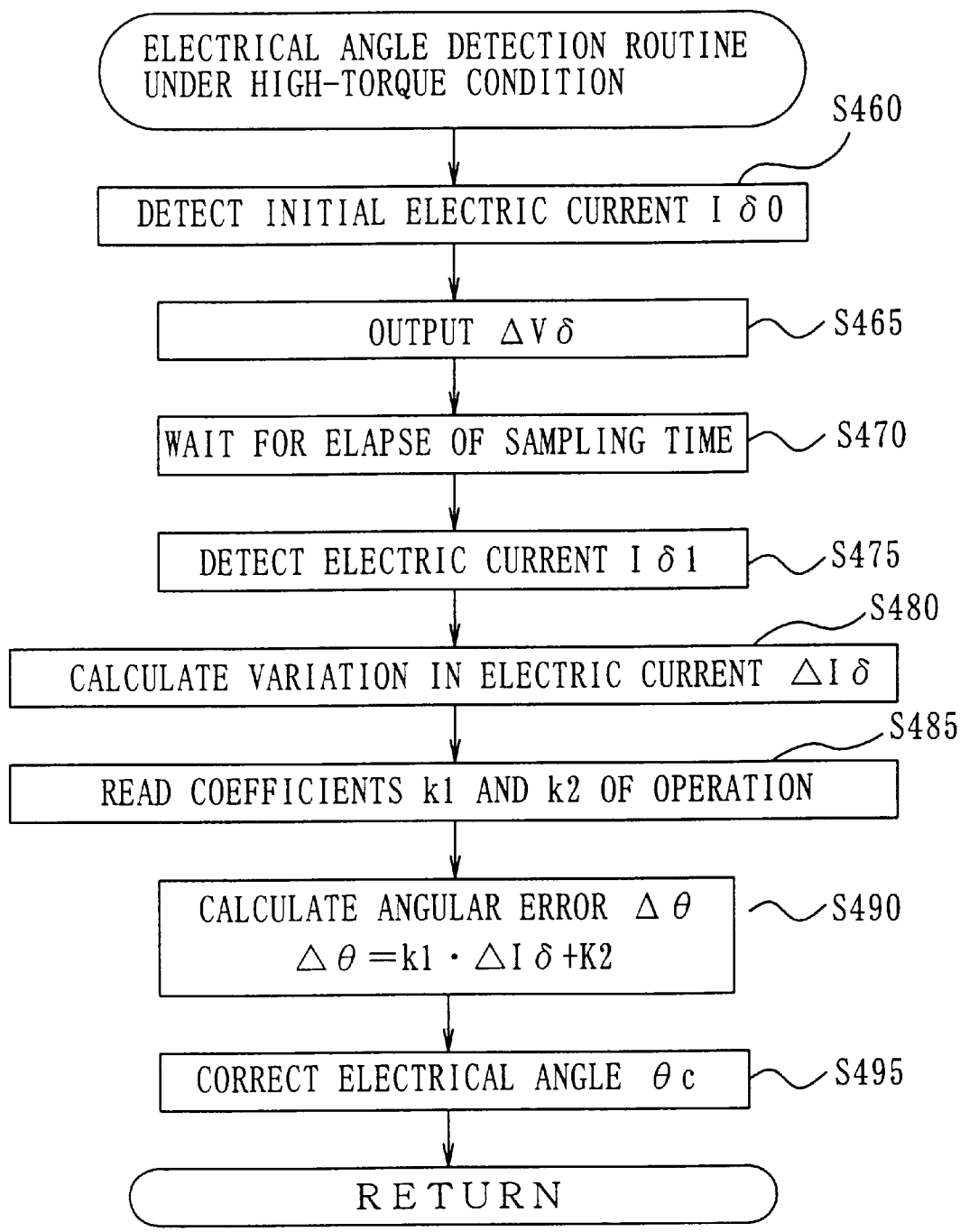
FIG. 17 is a flowchart showing the details of another electrical angle detection process under a high-torque condition executed at step S400 in the flowchart of FIG. 5 as a second embodiment according to the present invention.

FIG. 17 is a flowchart showing an electrical angle detection routine under the high-torque condition that is executed in the second embodiment. When the program enters the electrical angle detection routine under the high-torque condition, the CPU 120 detects an initial value I$\delta$0 of the electric current in the $\delta$-axis direction at step S460. As described later, the second embodiment detects the electrical angle only with the electric current in the $\delta$-axis direction, which corresponds to the q axis, and accordingly does not require detection of the initial value of the electric current in the $\gamma$-axis direction.

The concrete procedure of detecting the electric current in the $\delta$-axis direction is similar to that of the first embodiment. The CPU 120 receives signals output from the electric current sensors 102, 103, and 104, which measure the electric currents of the U, V, and W phases, via the filters 106, 107, and 108, the ADCs 112, 113, and 114, and the input port 116, and converts the input electric currents of the U, V, and W phases into the electric current in the $\delta$-axis direction based on the arithmetic operations discussed in (2) Motor Currents Control Process. Since the d axis and the q axis can be defined only after the determination of the electrical angle of the synchronous motor 40 as shown in FIG. 4, the CPU 120 estimates the $\delta$ axis based on an estimated electrical angle $\theta$c and determine the electric current in the $\delta$-axis direction. There is accordingly an angular error $\Delta\theta$ between the estimated electrical angle $\theta$c and an actual electrical angle $\theta$ as shown in FIG. 4.

The CPU 120 then applies a detection voltage $\Delta V\delta$ in the $\delta$-axis direction, which is specified based on the estimated electrical angle $\theta$c, at step S465. This is equivalent to superposition of a positive voltage $\Delta V\delta$ upon the initial voltage or addition of $\Delta V\delta$ to the initial voltage. While the first embodiment applies a negative voltage to the $\delta$ axis to be superposed upon the initial voltage, the second embodiment applies a positive voltage to the $\delta$ axis. The arrangement of the second embodiment may, however, be realized by application of a negative voltage as described later.

The CPU 120 waits for elapse of the sampling time ts at step S470, detects the electric current I$\delta$1 in the direction of the $\delta$ axis at step S475, and calculates a variation in electric current $\Delta$I$\delta$, which is a difference from the observed initial electric current I$\delta$0 at step S480. Whereas the first embodiment carries out the processing that eliminates the error regarding the variation in electric current due to a dead time loss (for example, the processing of steps S425 through S440 in the flowchart of FIG. 9), the second embodiment detects the electrical angle with a table including such errors and thereby does not require the processing to avoid the dead time loss. In the case where the table used for detection of the electrical angle does not include the effects of the dead time loss, the second embodiment also requires the correction discussed in the first embodiment.

The CPU 120 subsequently determines coefficients k1 and k2 applied for calculation of the electrical angle according to the torque command value at step S485. These coefficients k1 and k2 represent the slope and the intercept of an approximate plane curve, which approximates to the relationship between the angular error of the electrical angle and the variation in electric current $\Delta$I$\delta$. The coefficients k1 and k2 are mapped to the torque command value and stored in the form of a table. A concrete procedure of step S485 reads the coefficients k1 and k2 corresponding to the calculated variation in electric current $\Delta$I$\delta$ from the table and carries out interpolation according to the requirements, thereby determining the coefficients k1 and k2.

Figure 18:
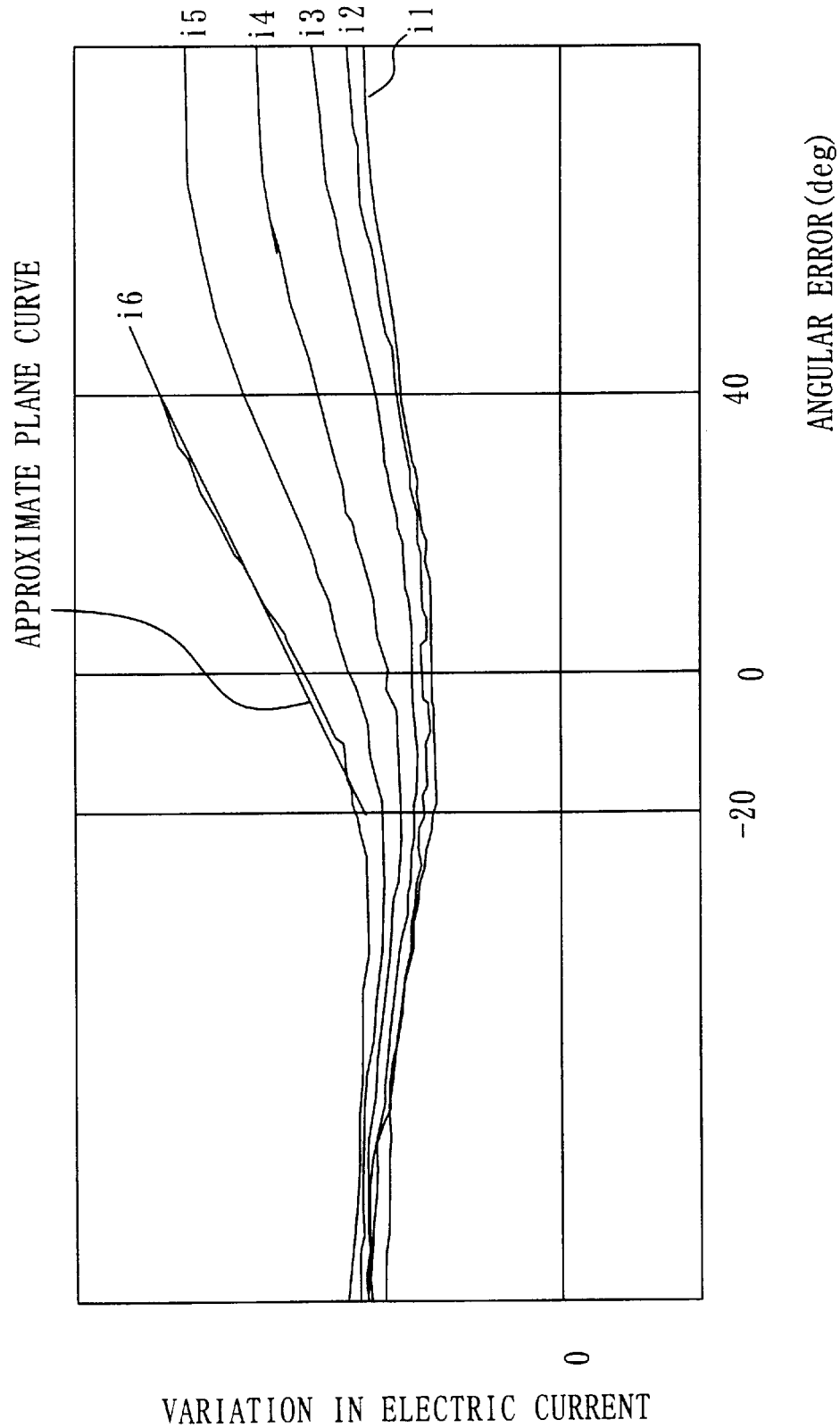
FIG. 18 is a graph showing the variation in electric current plotted against the angular error.
Figure 19:
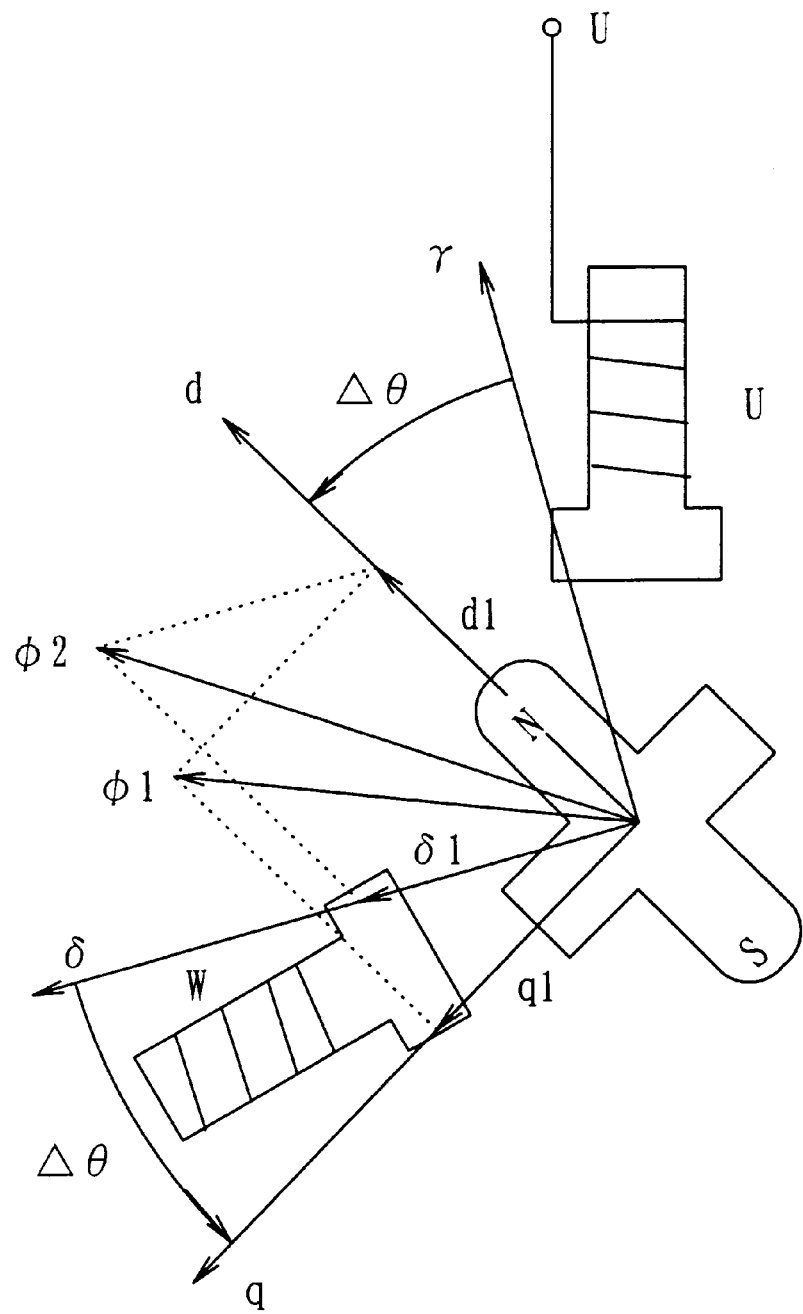
FIG. 19 shows the relationship between the angular error and the magnetic field under the high-torque condition.

The graph of FIG. 18 shows the relationships between the angular error of the electrical angle and the variation in electric current $\Delta$I$\delta$ with respect to a variety of torque command values. Parameters i1, i2, . . . represent the torque command values, and the torque command value increases in this sequence of the parameters i1, i2, . . . The reason of the presence of such relationships shown in FIG. 18 has been described previously. The relationships vary with the initial voltage of the motor 40, the detection voltage to be superposed upon the initial voltage, and the time and are determined experimentally. The graph of FIG. 18 shows the observed electric currents including the errors due to the dead time loss with respect to the applied voltage.

In the graph of FIG. 18, the curves of the variation in electric current $\Delta$I$\delta$ having significant differences according to the torque command value (i3 through i6) correspond to the high-torque condition. The threshold value T1 used to determine whether or not the electrical angle detection process under the high-torque condition is carried out in this embodiment (see step S200 in the flowchart of FIG. 5) is accordingly between the value i2 and the value i3. The threshold value may not coincide with the threshold value T1 in the first embodiment.

As shown in the graph of FIG. 18, the variation in electric current may be approximated by a plane curve in the range of the angular error from −20 degrees to 40 degrees. The coefficients k1 and k2 represent the slope and the Y intercept of the approximate plane curve. In the case where the angular error exceeds the above range, the variation in electric current can not be approximated by a plane curve as clearly understood from the graph of FIG. 18. The structure of the embodiment detects the electrical angle with a high frequency that enables the angular error to be kept within this range according to the revolving speed of the motor 40, thereby assuring the sufficient accuracy by the technique of plane curve approximation.

The CPU 120 calculates the angular error $\Delta\theta$ from the coefficients k1 and k2 thus determined at step S490 and corrects the estimated electrical angle $\theta c$ with the calculated angular error $\Delta\theta$ at step S495. The concrete procedure of this embodiment calculates the angular error $\Delta\theta$ from the coefficients k1 and k2 and the variation in electric current $\Delta I\delta$ according to he equation of $\Delta\theta = k1 \cdot \Delta I\delta + k2$.

Like the first embodiment, the electrical angle detection apparatus and the motor control apparatus 10 of the second embodiment can detect the electrical angle with a high accuracy and appropriately control the synchronous motor 40 even when a high torque is required while the motor 40 is in the state of low-speed operation. The second embodiment applies a positive voltage in the q-axis direction, which affects the output torque, to detect the electrical angle. This arrangement effectively prevents the output torque from being lower than the required torque. The second embodiment does not require the processing to cancel the errors due to the dead time loss (for examples, the processing of steps S425 through S440 in the flowchart of FIG. 9) in the process of detecting the variation in electric current. The structure of the embodiment accordingly realizes the higher-speed processing, compared with the electrical angle detection apparatus of the first embodiment.

The second embodiment detects the electrical angle at frequent intervals and prevents the angular error from being deviated from the range of −20 degrees to 40 degrees, in order to approximate the variation in electric current by a plane curve as shown in FIG. 18 and thereby improve the processing speed. One possible modification divides the graph of FIG. 18 into a plurality of divisions and adopts the technique of plane curve approximation. This enables the electrical angle to be detected even out of the range of the angular error. With a view to enhancing the accuracy of detection of the electrical angle, the variations in electric current may be approximated by curves or stored in the form of a table.

As clearly understood from FIG. 18, when the angular error is within the range of approximately −90 degrees to −30 degrees, there is only a slight variation in electric current according to the angular error. This does not ensure the sufficient accuracy of detection. When an extremely large error of the electrical angle is expected, for example, when the control procedure starts controlling the three-phase synchronous motor 40 that is at a stop, it is desirable that another technique of detecting the electrical angle is applied in combination with the technique of the embodiment, in order to restrict the range of the angular error. One example of the technique of detecting the electrical angle applicable in combination with the technique of the embodiment is disclosed in JAPANESE PATENT LAID-OPEN GAZETTE No. 7-177788.

In the second embodiment described above, the relationship between the angular error and the variation in electric current is stored in advance. One possible application uses, instead of this relationship, the relationship between the angular error and the required time period from the time point at which application of the detection voltage starts to the time point at which the variation in electric current reaches a predetermined level. This structure effectively prevents the electric current from significantly exceeding the rated level of the three-phase synchronous motor 40.

In the second embodiment, a positive voltage is applied for detection of the electrical angle. A negative voltage may, however, be applied in the method of the second embodiment. For example, a negative voltage is applied for detection of the electrical angle in the case where superposition of a positive detection voltage upon the initial voltage applied corresponding to the torque command value may cause the electric current to significantly exceed the rated level of the three-phase synchronous motor 40. In this case, the relationship corresponding to that of FIG. 18 with respect to a negative applied voltage should be experimentally determined in advance.

The present invention is not restricted to the above embodiments or their modifications, but there may be many other modifications, changes, and alterations without departing from the scope or spirit of the main characteristics of the present invention.

It should be clearly understood that the above embodiments are only illustrative and not restrictive in any sense. The scope and spirit of the present invention are limited only by the terms of the appended claims.

What is claimed is:

1. In a synchronous motor that rotates a rotor through an interaction between a magnetic field occurring when multiphase alternating currents are flown through windings and a magnetic field produced by permanent magnets, an electrical angle detection apparatus that detects an electrical angle, the electrical angle defining a d-axis direction, which passes through a center of rotation of said rotor and goes along the magnetic field produced by said permanent magnets, and a q-axis direction, which is electrically perpendicular to said d-axis direction in a plane of rotation of said rotor, said electrical angle detection apparatus comprising:

a torque voltage controller that applies a torque voltage to said windings, said torque voltage being applied corresponding to a torque command value to be output by said synchronous motor;

a detection voltage controller that applies a predetermined detection voltage in a first direction for a predetermined application time period to be superposed upon said torque voltage, when said torque command value is present within a predetermined range, which includes a specific torque command value that causes magnetic saturation of said windings by application of said torque voltage;

an electric current detection unit that detects variations in electric currents flowing in a second direction, which is estimated as said d-axis direction, and said first direction, which is estimated as said q-axis direction, corresponding to said superposed detection voltage; and an electrical angle computation unit that calculates the electrical angle of said synchronous motor, based on the variations in electric currents detected by said electric current detection sensor.

2. An electrical angle detection apparatus in accordance with claim 1, wherein said predetermined detection voltage is a predetermined negative detection voltage.

3. An electrical angle detection apparatus in accordance with claim 2, wherein said detection voltage controller applies said predetermined detection voltage to be superposed upon said torque voltage, only when said torque command value is not less than a specific value relating to occurrence of the magnetic saturation.

4. An electrical angle detection apparatus in accordance with claim 2, wherein at least one of an absolute value of said predetermined detection voltage applied by said detection voltage controller and said predetermined application time period monotonously decreases with a decrease of said torque command value.

5. An electrical angle detection apparatus in accordance with claim 2, wherein said detection voltage controller applies said predetermined negative detection voltage in said first direction for a predetermined first time period to be superposed upon said torque voltage, and subsequently applies a predetermined positive detection voltage in said first direction, for a predetermined second time period to be superposed upon said torque voltage.

6. An electrical angle detection apparatus in accordance with claim 1, said electrical angle detection apparatus further comprising:

a memory, in which a specific relation of an angular error between an estimated electrical angle and a true electrical angle to the variation in electric current flowing in said first direction is stored in advance against said torque command value, wherein said electrical angle computation unit reads the angular error corresponding to the detected variation in electric current from said specific relation stored in said memory, and thereby calculates the electrical angle of said synchronous motor.

7. An electrical angle detection apparatus in accordance with claim 6, wherein said predetermined detection voltage is a predetermined positive detection voltage.

8. An electrical angle detection apparatus in accordance with claim 6, wherein said detection voltage controller applies said predetermined detection voltage to be superposed upon said torque voltage, only when said torque command value is not less than a specific value relating to occurrence of the magnetic saturation.

9. In a synchronous motor that rotates a rotor through an interaction between a magnetic field occurring when multi-phase alternating currents are flown through windings and a magnetic field produced by permanent magnets, a method of detecting an electrical angle, the electrical angle defining a d-axis direction, which passes through a center of rotation of said rotor and goes along the magnetic field produced by said permanent magnets, and a q-axis direction, which is electrically perpendicular to said d-axis direction in a plane of rotation of said rotor, said method comprising the steps of:

(a) applying a torque voltage to said windings, said torque voltage being applied corresponding to a torque command value to be output by said synchronous motor;

(b) applying a predetermined detection voltage in a first direction, which is estimated as said q-axis direction, for a predetermined application time period to be superposed upon said torque voltage, when said torque command value to be output by said synchronous motor is present within a predetermined range, which includes a specific torque command value that causes magnetic saturation of said windings by application of said torque voltage;

(c) detecting variations in electric currents flowing in a second direction, which is estimated as said d-axis direction, and said first direction corresponding to said superposed detection voltage; and (d) calculating the electrical angle of said synchronous motor, based on the variations in electric currents detected in said step (c).

10. A method in accordance with claim 9, wherein said predetermined detection voltage is a predetermined negative detection voltage.

11. A method in accordance with claim 9, wherein said step (d) comprises the step of:

reading an angular error between an estimated electrical angle and a true electrical angle corresponding to the detected variation in electric current from a pre-stored relation of the angular error to the variation in electric current flowing in said first direction and thereby calculating the electrical angle of said synchronous motor.

12. A motor control apparatus that controls a synchronous motor based on an electrical angle, said synchronous motor rotating a rotor through an interaction between a magnetic field occurring when multi-phase alternating currents are flown through windings and a magnetic field produced by permanent magnets, the electrical angle defining a d-axis direction, which passes through a center of rotation of said rotor and goes along the magnetic field produced by said permanent magnets, and a q-axis direction, which is electrically perpendicular to said d-axis direction in a plane of rotation of said rotor, said motor control apparatus comprising:

a unit that inputs a torque command value to be output by said synchronous motor;

a torque voltage controller that estimates the electrical angle and applies a torque voltage, which is set according to the estimated electrical angle and the input torque command value;

a detection voltage controller that applies a predetermined detection voltage in a first direction, which is estimated as said q-axis direction, for a predetermined application time period to be superposed upon said torque voltage, when said torque command value to be output by said synchronous motor is present within a predetermined range, which includes a specific torque command value that causes magnetic saturation of said windings by application of said torque voltage;

an electric current detection sensor that detects variations in electric currents flowing in a second direction, which is estimated as said d-axis direction, and said first direction corresponding to said superposed detection voltage;

an electrical angle computation unit that calculates the electrical angle of said synchronous motor, based on the variations in electric currents detected by said electric current detection sensor; and a unit that supplies the calculated electrical angle as data used for estimation of the electrical angle to said voltage controller that repeatedly applies said superposed voltage.

13. A motor control apparatus in accordance with claim 12, wherein said predetermined detection voltage is a predetermined negative detection voltage.

14. A motor control apparatus in accordance with claim 12, said motor control apparatus further comprising:

a memory, in which a specific relation of an angular error between the estimated electrical angle and a true electrical angle to the variation in electric current flowing in said first direction is stored in advance against said torque command value, wherein said electrical angle computation unit reads the angular error corresponding to the detected variation in electric current from said specific relation stored in said memory, and thereby calculates the electrical angle of said synchronous motor.

* * * * *

UNITED STATES PATENT AND TRADEMARK OFFICE
CERTIFICATE OF CORRECTION

PATENT NO. : 6,051,946
DATED : April 18, 2000
INVENTOR(S): Eiji YAMADA, et al.

It is certified that an error appears in the above-identified patent and that said Letters Patent is hereby corrected as shown below:

On the Title page, Item [75], the 2nd Inventor's residency is incorrectly listed; also Item [30], the Foreign Application Priority Data, is incorrect.

Item [75] should read as follows:

--- [75] Inventors: Eiji Yamada, Owariasahi; Yasutomo Kawabata, Aichi-gun, both of Japan ---

Also,

Item [30] should read as follows:

--- [30] Foreign Application Priority Data

Sep. 12, 1997 [JP] Japan ............................. 9-268096
Nov. 20, 1997 [JP] Japan ............................. 9-337966 ---87

Signed and Sealed this

Tenth Day of April, 2001

Attest:

NICHOLAS P. GODICI

Attesting Officer    Acting Director of the United States Patent and Trademark Office